United States Patent
Ma et al.

(10) Patent No.: US 7,286,447 B2
(45) Date of Patent: Oct. 23, 2007

(54) RECORDING AND/OR REPRODUCING APPARATUS AND METHOD OF CONTROLLING THE SAME

(75) Inventors: Byung-in Ma, Gyeonggi-do (KR); Kwan-joon Kim, Seoul (KR); In-sik Park, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 496 days.

(21) Appl. No.: 10/302,995

(22) Filed: Nov. 25, 2002

(65) Prior Publication Data

US 2003/0099168 A1 May 29, 2003

(30) Foreign Application Priority Data

Nov. 26, 2001 (KR) .............................. 2001-73754

(51) Int. Cl.
  *G11B 7/007* (2006.01)
(52) U.S. Cl. .................................................. 369/44.13
(58) Field of Classification Search ............ 369/44.13, 369/53.19
  See application file for complete search history.

(56) References Cited

U.S. PATENT DOCUMENTS

| 5,303,216 | A | * | 4/1994 | Shinoda et al. ........... 369/44.13 |
| 5,696,757 | A | * | 12/1997 | Ozaki et al. .............. 369/47.35 |
| 5,832,088 | A | * | 11/1998 | Nakajima et al. ............. 380/22 |
| 5,848,050 | A | * | 12/1998 | Nagasawa et al. ........ 369/275.4 |
| 5,852,599 | A | * | 12/1998 | Fuji ........................ 369/275.4 |
| 5,936,921 | A | * | 8/1999 | Iimura ...................... 369/47.25 |
| 6,243,352 | B1 | | 6/2001 | Kanno et al. |
| 6,407,978 | B1 | * | 6/2002 | Kim ....................... 369/124.13 |
| 6,526,007 | B1 | * | 2/2003 | Fujita ....................... 369/44.32 |
| 6,643,239 | B2 | * | 11/2003 | Nakajo ..................... 369/53.26 |
| 6,791,916 | B2 | * | 9/2004 | Tateishi et al. .......... 369/44.32 |
| 6,856,586 | B2 | * | 2/2005 | Usui et al. ................ 369/47.28 |
| 6,912,190 | B2 | * | 6/2005 | Inokuchi et al. ......... 369/59.15 |
| 2001/0010667 | A1 | | 8/2001 | Nakajo |

FOREIGN PATENT DOCUMENTS

| JP | 05-151600 | 6/1993 |
| JP | 09-134538 | 5/1997 |
| JP | 11-316959 | 11/1999 |
| JP | 2000-048382 | 2/2000 |
| JP | 2000-276743 | 10/2000 |
| JP | 2000-315327 | 11/2000 |
| JP | 2001-143328 | 5/2001 |
| JP | 2001-256658 | 9/2001 |

OTHER PUBLICATIONS

Chinese Office Action dated Aug. 26, 2005, issued in corresponding Chinese Patent Application No. 02145844.8 and English Translation.

* cited by examiner

*Primary Examiner*—Gautam R. Patel
(74) *Attorney, Agent, or Firm*—Stein, McEwen & Bui, LLP

(57) ABSTRACT

A recording and/or reproducing apparatus and a method of controlling the same. The method of controlling the apparatus for recording information in or reproducing information from a disc having a wobbled track, the method includes detecting a wobble signal recorded in the wobbled track, and removing an error component occurring during the recording or the reproducing, based on the detected wobble signal. Accordingly, errors arising from a variety of factors can be accurately compensated for during a recording or reproducing operation.

10 Claims, 19 Drawing Sheets

RECORDING AND/OR REPRODUCING APPARATUS AND METHOD OF CONTROLLING THE SAME

CROSS-REFERENCE TO RELATED APPLICATIONS

This application claims the benefit of Korean Patent Application No. 2001-73754 filed on Nov. 26, 2001, in the Korean Intellectual Property Office, the disclosure of which is incorporated herein by reference.

BACKGROUND OF THE INVENTION

1. Field of the Invention

The present invention relates to recording data in and reproducing data from an optical disc, and more particularly, to an apparatus which records data in and reproduces data from an optical disc having a wobbled track, and a method of controlling the apparatus.

2. Description of the Related Art

Generally, a recording density of an optical disc increases as the diameter of a laser beam decreases. To decrease the diameter of a laser beam, a short-wavelength laser source is used, and the numerical aperture (NA) of an objective lens of a pickup device is increased. As the diameter of a laser beam decreases, a focus error with respect to a recording layer increasingly influences the degradation of a signal quality. Accordingly, a majority of optical disc recording and/or reproducing apparatuses possess a device which compensates for a focus error.

A spherical aberration which occurs due to a change in the thickness of an optical disc is proportional to $\lambda/(NA)^4$. For example, where an optical disc has $\lambda=400$ nm and NA=0.85, a thickness deviation is strictly limited within ±3.4 μm because a signal quality is greatly degraded where the thickness deviation of an optical disc goes beyond ±3.4 μm. Usually, optical discs include a plurality of recording layers to increase the recording capacity. Here, a distance between the recording layers is about several tens of micrometers. In the case of optical discs having a plurality of recording layers, a thickness deviation goes beyond an allowable range. Accordingly, an accurate recording or reproducing is not impossible. Therefore, a recording and/or reproducing apparatus for an optical disc having a plurality of recording/reproducing layers requires a device which compensates for a change in the thickness of the optical disc.

FIG. 1 shows a conceptional diagram of a method of compensating for a focus error in a conventional recording and/or reproducing apparatus. Referring to FIG. 1, a radio frequency (RF) signal is used to compensate for a focus error of a pickup device (not shown) provided in the conventional recording and/or reproducing apparatus. Beams which have been reflected from a recording/reproducing layer and received by a light receiving unit via an objective lens of the pickup device are combined together to form the RF signal. The RF signal is transmitted through a low-pass filter (LPF) 100 and is output as an average V1 with respect to a predetermined interval. Generally, during a recording or reproduction, the larger an amplitude of the average V1, the better it is. This is because the average V1 carries information recorded in an optical disc, and it is easier to read the information as the amplitude of the average V1 increases. Accordingly, a processor 200 monitors the amplitude of the average V1 while variously changing a magnitude of an error compensation signal V2 that is to be added to a focus error signal, and obtains the error compensation signal V2 where the average V1 is at a maximum. The obtained error compensation signal V2 is added to the focus error signal and is then input into a focus controller 300. Through this procedure, a focus error can be compensated where a recording and/or reproducing apparatus is recording or reproducing data.

However, the RF signal is not sensitive to a variety of errors, such as a focus error and an error due to a change in a thickness. More specifically, in the case of an optical disc for recording in which information is rarely recorded, a variation of an RF signal is very slight. Accordingly, the RF signal is not a proper reference signal for an accurate control, particularly, where a high density and mass capacity of an optical disc require an accurate error compensation.

SUMMARY OF THE INVENTION

Accordingly, it is an object of the present invention to provide a recording and/or reproducing apparatus which accurately compensates for errors occurring due to a variety of causes during a recording or reproducing operation, and a method of controlling the same.

Additional objects and advantages of the invention will be set forth in part in the description which follows and, in part, will be obvious from the description, or may be learned by practice of the invention.

To achieve the above and other objects of the present invention, there is provided a method of controlling an apparatus for recording information in or reproducing information from a disc having a wobbled track, the method comprising detecting a wobble signal recorded in the wobbled track, and removing an error component occurring during the recording or reproducing, based on the detected wobble signal.

The removing of the error component may comprise extracting a characteristic of the wobble signal, and generating an error compensation signal to remove the error component, based on the extracted characteristic.

The extracting of the characteristic of the wobble signal may comprise extracting at least one characteristic among a jitter, an error rate, an amplitude, an envelope, and a peak value of the wobble signal. The generating of the error compensation signal may comprise changing a predetermined error compensation signal, monitoring the extracted characteristic, and fixing the error compensation signal in response to the extracted characteristic allowing for an accurate recording or reproduction.

To achieve the above and other objects of the present invention, there is also provided an apparatus for recording information in or reproducing information from a disc having a wobbled track.

According to an embodiment of the present invention, the apparatus comprises a wobble signal detection unit which detects a wobble signal from the disc, and an error compensation unit which removes an error component occurring during the recording and reproduction, based on the wobble signal detected by the wobble signal detection unit. The error compensation unit may include a characteristic extractor which extracts a characteristic of the wobble signal, and a processor which outputs an error compensation signal to remove the error component, based on the extracted characteristic. The processor changes a predetermined error compensation signal, monitors the characteristic extracted by the characteristic extractor, and fixes the error compensation signal in response to the extracted characteristic allowing for an accurate recording or reproduction.

According to another embodiment of the present invention, the apparatus comprises a wobble signal detector which detects a wobble signal from the disc, a characteristic extractor which extracts at least one characteristic among a jitter, an error rate, an amplitude, an envelope, and a peak value of the detected wobble signal, a focus error generator which outputs a focus error signal, a focus controller which performs a focus control based on the focus error signal, and a processor which outputs a focus error compensation signal to compensate for the focus error signal, based on the characteristic extracted by the characteristic extractor.

According to yet another embodiment of the present invention, the apparatus comprises a wobble signal detector which detects a wobble signal from the disc, a characteristic extractor which extracts at least one characteristic among a jitter, an error rate, an amplitude, an envelope, and a peak value of the detected wobble signal, a tracking error generator which outputs a tracking error signal, a tracking controller which performs a tracking control based on the tracking error signal, and a processor which outputs a tracking error compensation signal to compensate for the tracking error signal, based on the characteristic extracted by the characteristic extractor.

According to still another embodiment of the present invention, the apparatus comprises a wobble signal detector which detects a wobble signal from the disc, a characteristic extractor which extracts at least one characteristic among a jitter, an error rate, an amplitude, an envelope, and a peak value of the detected wobble signal, an error controller which performs an error control according to a thickness deviation of the disc, and a processor which outputs an error compensation signal determined based on the characteristic extracted by the characteristic extractor to the error controller.

BRIEF DESCRIPTION OF THE DRAWINGS

The above object and advantages of the present invention will become more apparent by describing in detail preferred embodiments thereof with reference to the accompany drawings in which.

DETAILED DESCRIPTION OF THE PREFERRED EMBODIMENTS

Figure 1:
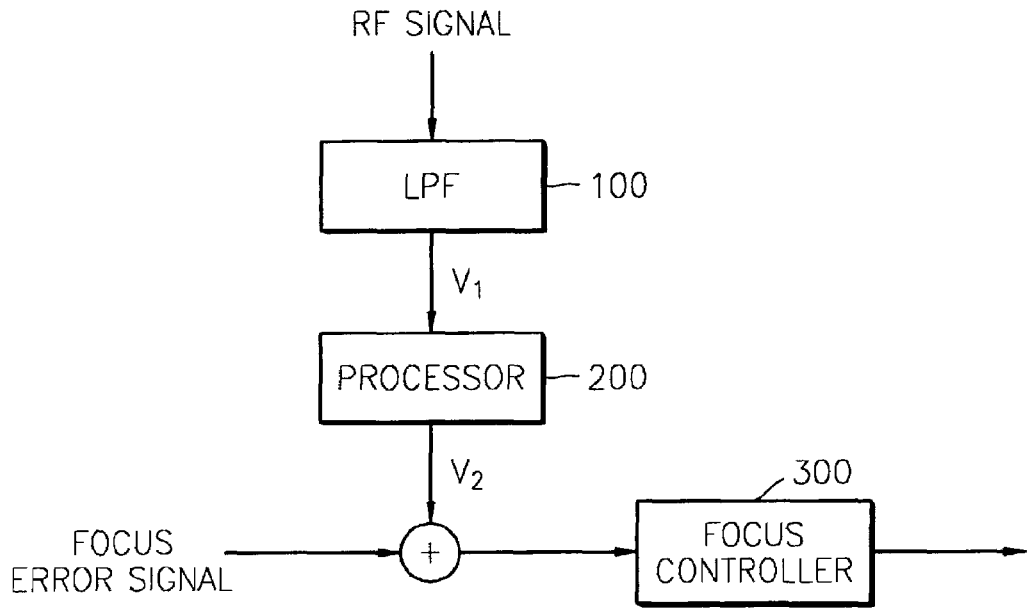
FIG. 1 is a conceptional diagram of a method of compensating for a focus error in a conventional recording and/or reproducing apparatus.

Reference will now be made in detail to the embodiments of the present invention, examples of which are illustrated in the accompanying drawings, wherein like reference numerals refer to the like elements throughout. The embodiments are described below in order to explain the present invention by referring to the figures.

Figure 2A:
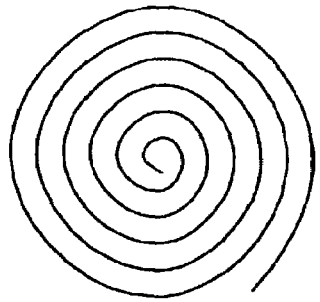
FIGS. 2A through 3B are illustrative diagrams of optical discs.
Figure 2B:
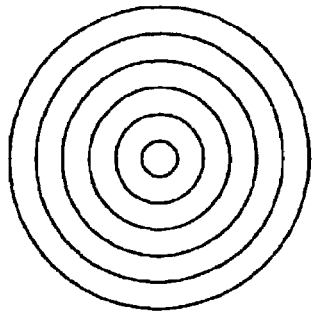
Figure 3A:
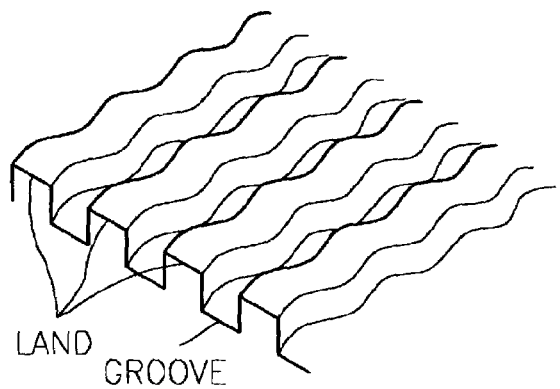
Figure 3B:
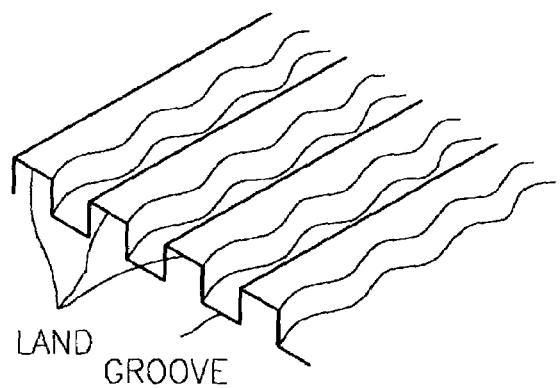

FIGS. 2A through 3B show diagrams of optical discs. Referring to FIGS. 2A and 2B, spiral or concentric tracks (groove and land tracks) are formed on a recording/reproducing layer of an optical disc. In FIG. 3A, wobble signals are recorded on both sides of tracks. In FIG. 3B, a wobble signal is recorded on one side of each track. A track in which a wobble signal is recorded is referred to as a wobbled track. A wobble signal is used to record, for example, an auxiliary clock signal to obtain synchronous information during a recording or reproducing operation.

Figure 4:
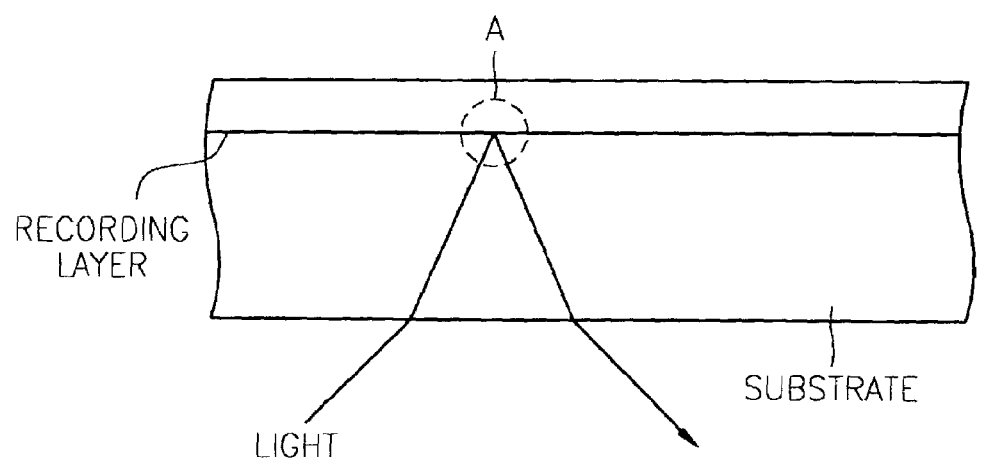
FIG. 4 is a sectional view of an optical disc.

FIG. 4 shows a sectional view of an optical disc. Referring to FIG. 4, the optical disc is provided with a recording/reproducing layer on which information is recorded. A recording and/or reproducing apparatus records information in an optical disc by forming recording pits or changing a phase on the optical disc by radiating a laser beam onto a recording layer of the optical disc. The apparatus reads information from the optical disc by radiating a laser beam onto the optical disc, receives the laser beam reflected from the recording layer, and performs a proper signal processing on the received laser beam.

There are a variety of factors which cause errors during a recording or reproducing operation. For example, a recording or reproducing operation can be properly performed where a laser beam is focused on an exact recording/reproducing layer "A." Otherwise, a focus error occurs. Where a thickness of a substrate of the optical disc is not uniform, a spherical aberration occurs. In addition, where a rotation speed of an optical disc is not constant, jitters occur. Errors which occur during a recording or reproducing operation degrade a signal quality.

Figure 5A:
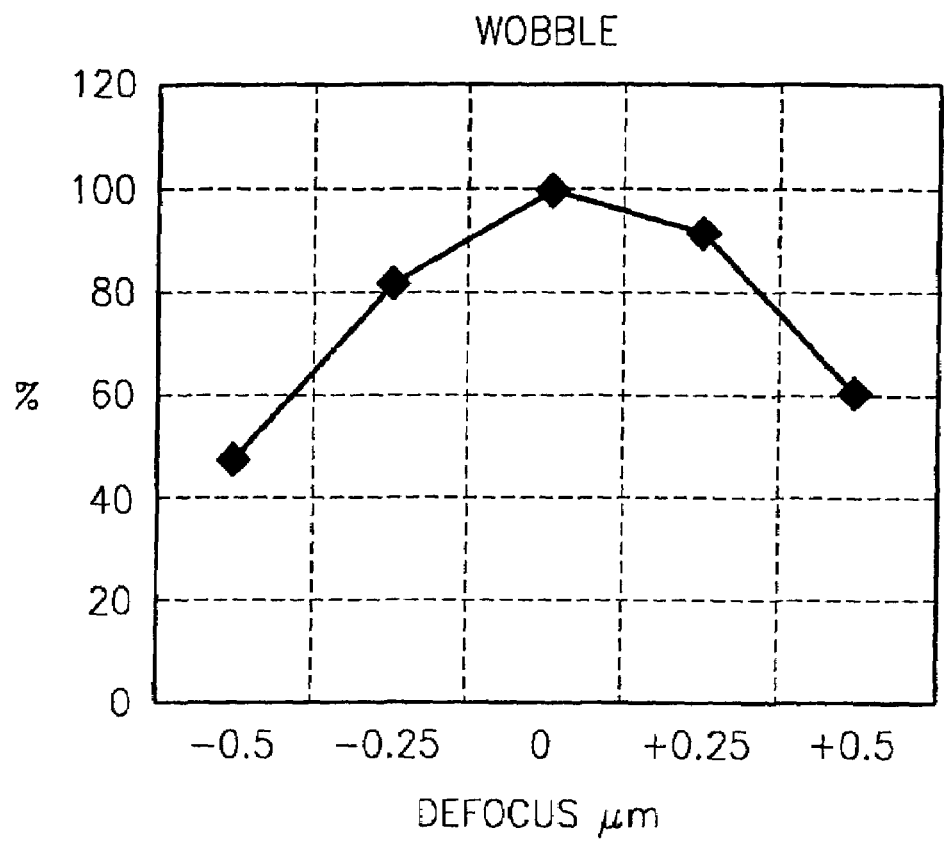
FIGS. 5A, 5B, 6A and 6B are graphs for comparing a wobble signal with a radio frequency (RF) signal in terms of an error sensitivity.
Figure 5B:
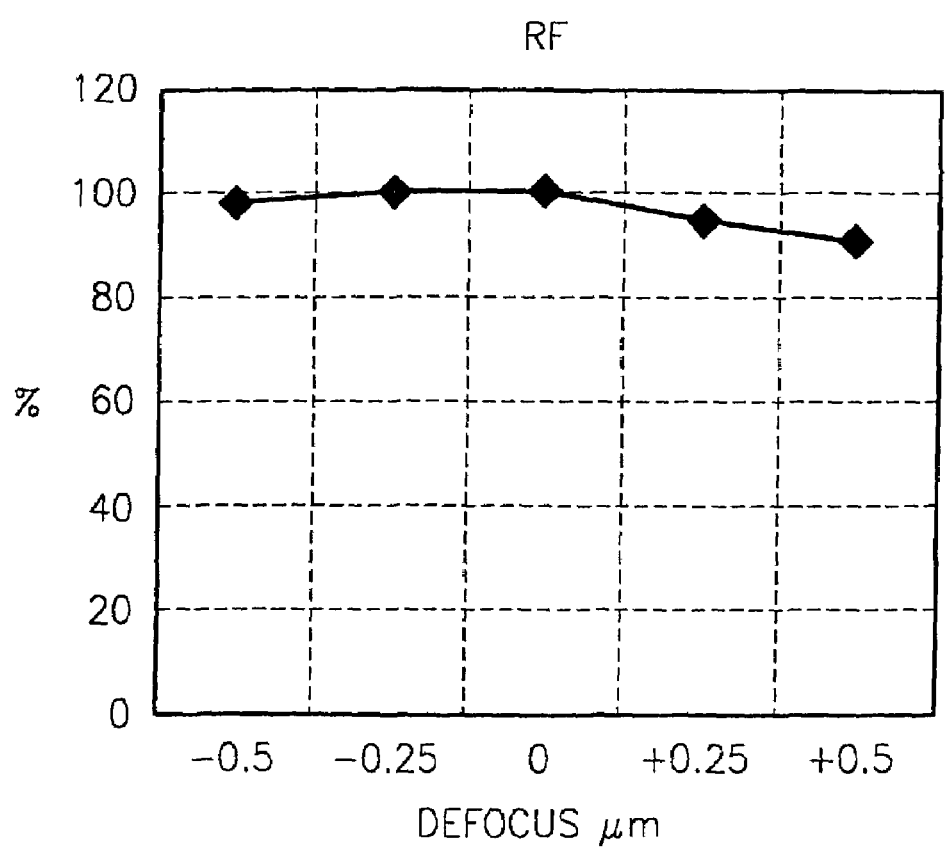
Figure 6A:
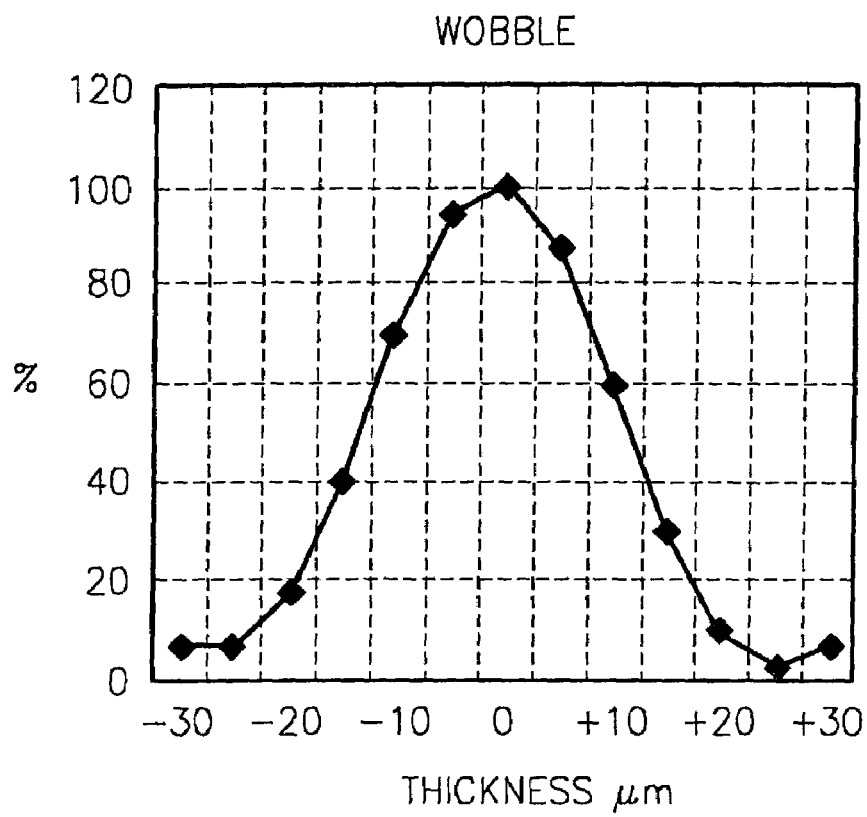
Figure 6B:
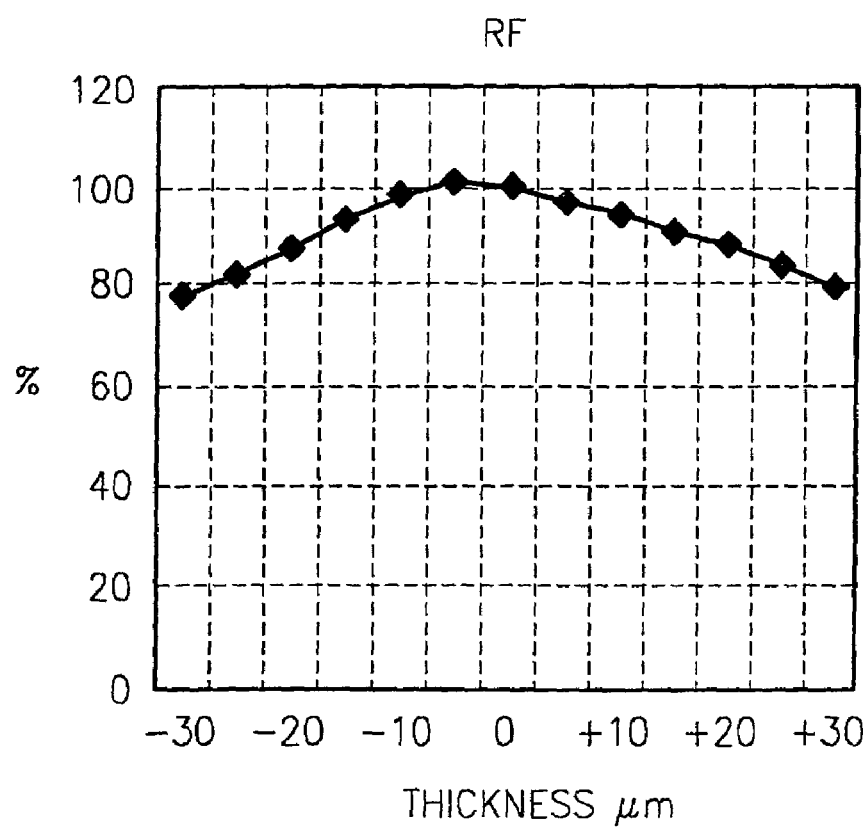

FIGS. 5A through 6B show comparison graphs of a wobble signal with a radio frequency (RF) signal in terms of an error sensitivity. As shown in FIGS. 5A and 5B, where a focus error occurs, an amplitude of a wobble signal changes greatly, but an amplitude of an RF signal changes very slightly. As shown in FIGS. 6A and 6B, where a thickness of a substrate changes, an amplitude of a wobble signal changes greatly, but an amplitude of an RF signal changes slightly. Accordingly, in the present invention, a wobble signal is used as a reference signal to more accurately compensate for an error occurring in a recording or reproducing operation.

Figure 7:
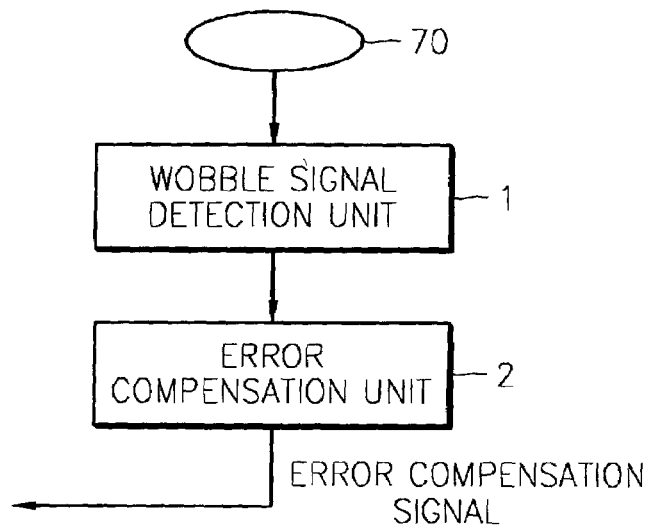
FIG. 7 is a block diagram of a recording and/or reproducing apparatus according to an embodiment the present invention.

FIG. 7 shows a block diagram of a recording and/or reproducing apparatus according to the present invention. Referring to FIG. 7, the recording and/or reproducing apparatus records information in or reproduces information from a disc 70 having wobbled tracks and includes a wobble signal detection unit 1 and an error compensation unit 2. The wobble signal detection unit 1 detects a wobble signal recorded on a wobbled track of the disc 70. The error compensation unit 2 outputs an error compensation signal to remove an error component occurring during a recording or reproducing operation, based on the detected wobble signal.

Figure 8:
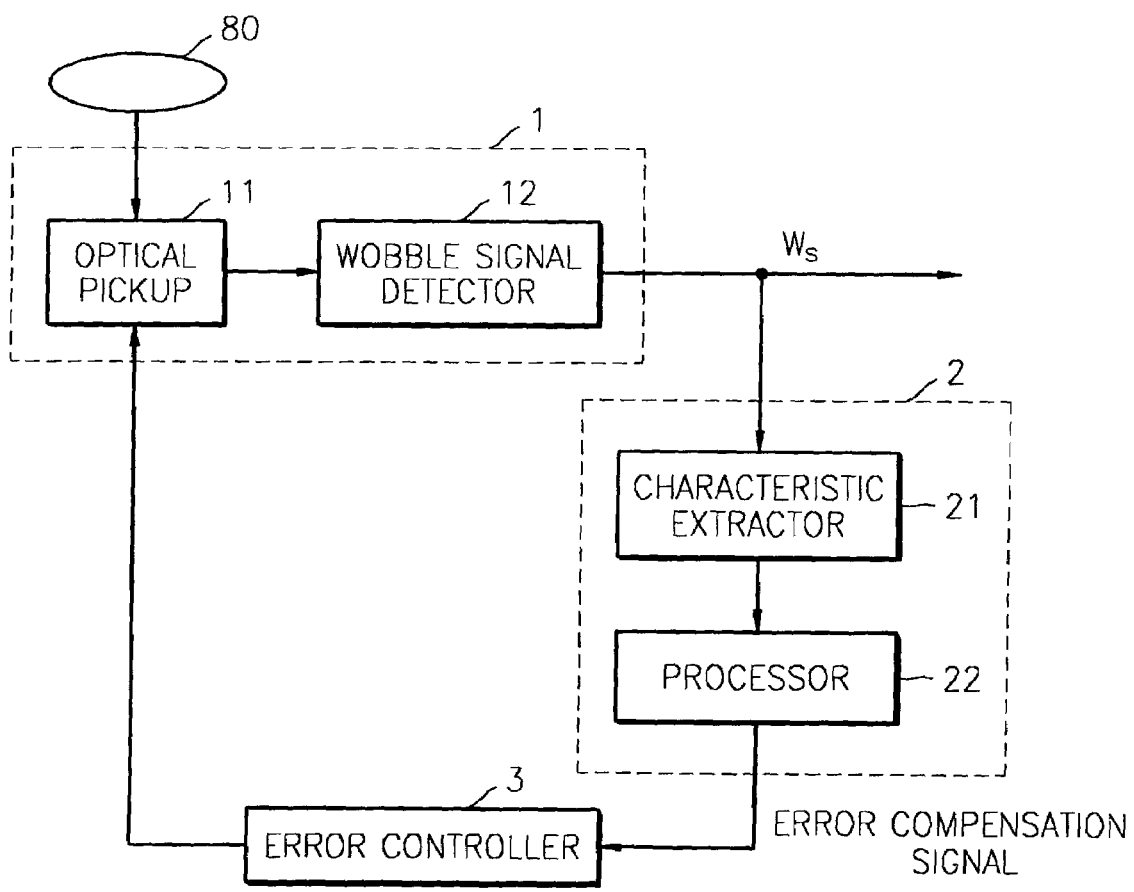
FIG. 8 is a block diagram of an embodiment of the recording and/or reproducing apparatus shown in FIG. 7.

FIG. 8 shows a block diagram of an embodiment of the recording and/or reproducing apparatus shown in FIG. 7. As shown in FIG. 8, the wobble signal detection unit 1 includes an optical pickup 11 and a wobble signal detector 12. The optical pickup 11 radiates a laser beam onto a recording/reproducing layer of an optical disc 80, receives the laser beam reflected from the recording/reproducing layer, and outputs it as a signal. The wobble signal detector 12 detects a wobble signal from the signal output from the optical pickup 11.

The error compensation unit 2 includes a characteristic extractor 21 and a processor 22. The characteristic extractor 21 extracts a characteristic of a wobble signal. The characteristic may be extracted as a characteristic value or a characteristic signal. For example, the characteristic value indicates a jitter, an error rate, an amplitude, or a peak value, and the characteristic signal indicates an envelope. The processor 22 determines an error compensation signal to remove an error component based on the extracted characteristic value or the characteristic signal, and outputs the determined error compensation signal to an error controller 3. For example, the processor 22 variously changes a predetermined signal, outputs the variously changed signals to the error controller 3, and simultaneously monitors error rates to determine a signal, which brings the error rate to a minimum, as an error compensation signal. The error controller 3 receives the error compensation signal and performs a proper error control operation.

Figure 9:
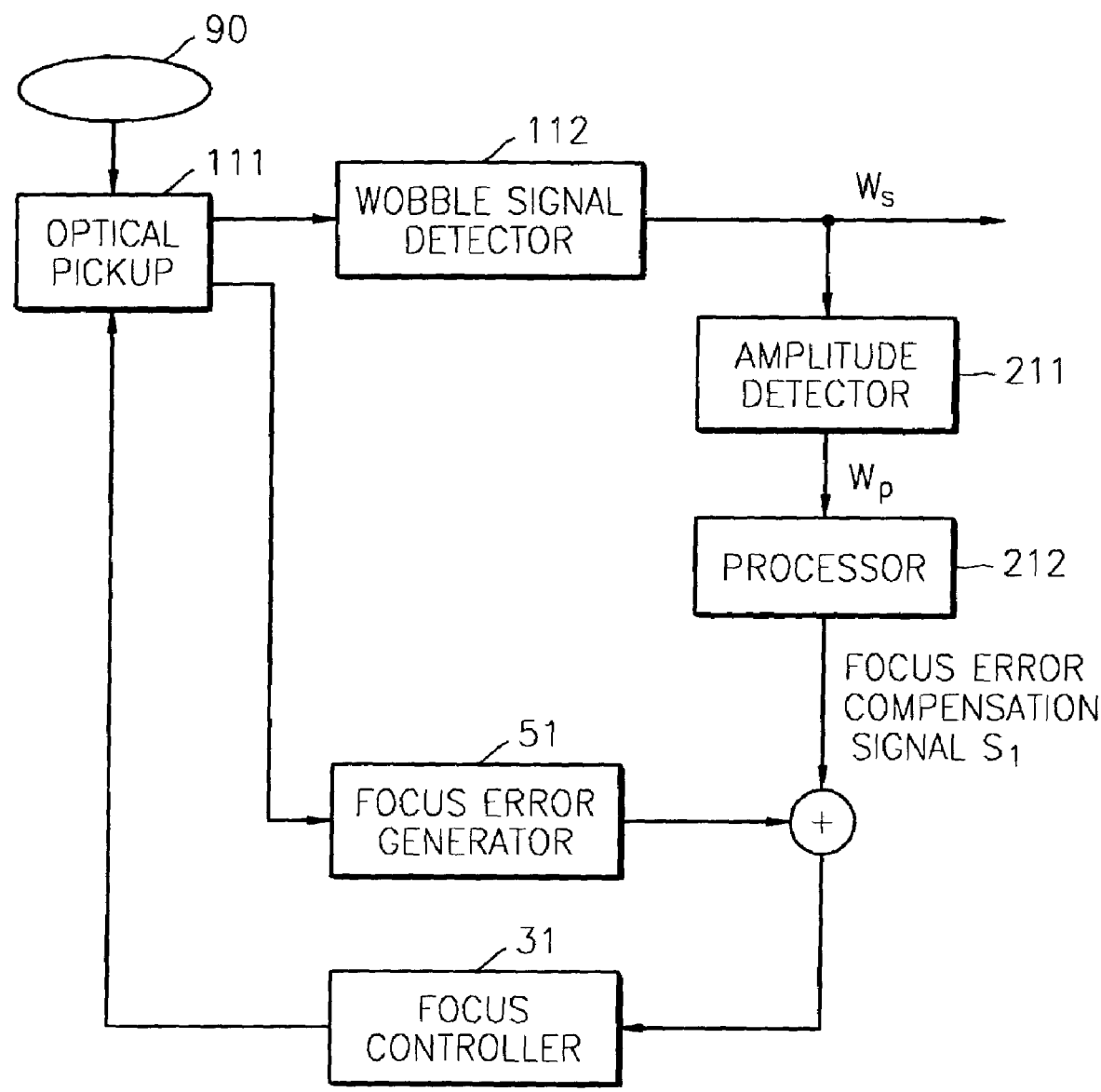
FIG. 9 is a block diagram of a first implementation of the recording and/or reproducing apparatus shown in FIG. 8.

FIG. 9 shows a block diagram of a first implementation of the recording and/or reproducing apparatus shown in FIG. 8. As shown in FIG. 9, the recording and/or reproducing apparatus includes an optical pickup 111, a wobble signal detector 112, and a processor 212. In the first implementation, an amplitude detector 211, which detects an amplitude from a wobble signal $W_s$ and outputs an amplitude detection signal $W_p$, is provided as a characteristic extractor. Furthermore, a focus error generator 51 and a focus controller 31 which control a focus error are provided. The focus error generator 51 outputs a focus error signal to focus a laser beam radiating from the optical pickup 111 onto a recording/reproducing layer of an optical disc 90 to the focus controller 31. The focus controller 31 generates a control signal based on the focus error signal and transmits the control signal to the optical pickup 111 to achieve a reliable focusing.

The processor 212 continuously monitors the amplitude detection signal $W_p$ while variously changing a predetermined signal and outputting the variously changed signals to the focus controller 31, and determines a signal, which brings the amplitude to a maximum, as a focus error compensation signal $S_1$. The focus error compensation signal $S_1$ is added to the focus error signal generated from the focus error generator 51 and is then input to the focus controller 31. Thus, the focus controller 31 can perform a reliable focus control. The functional blocks having the same names as those in FIG. 8 perform the same functions, and thus descriptions thereof will be omitted.

Figure 10:
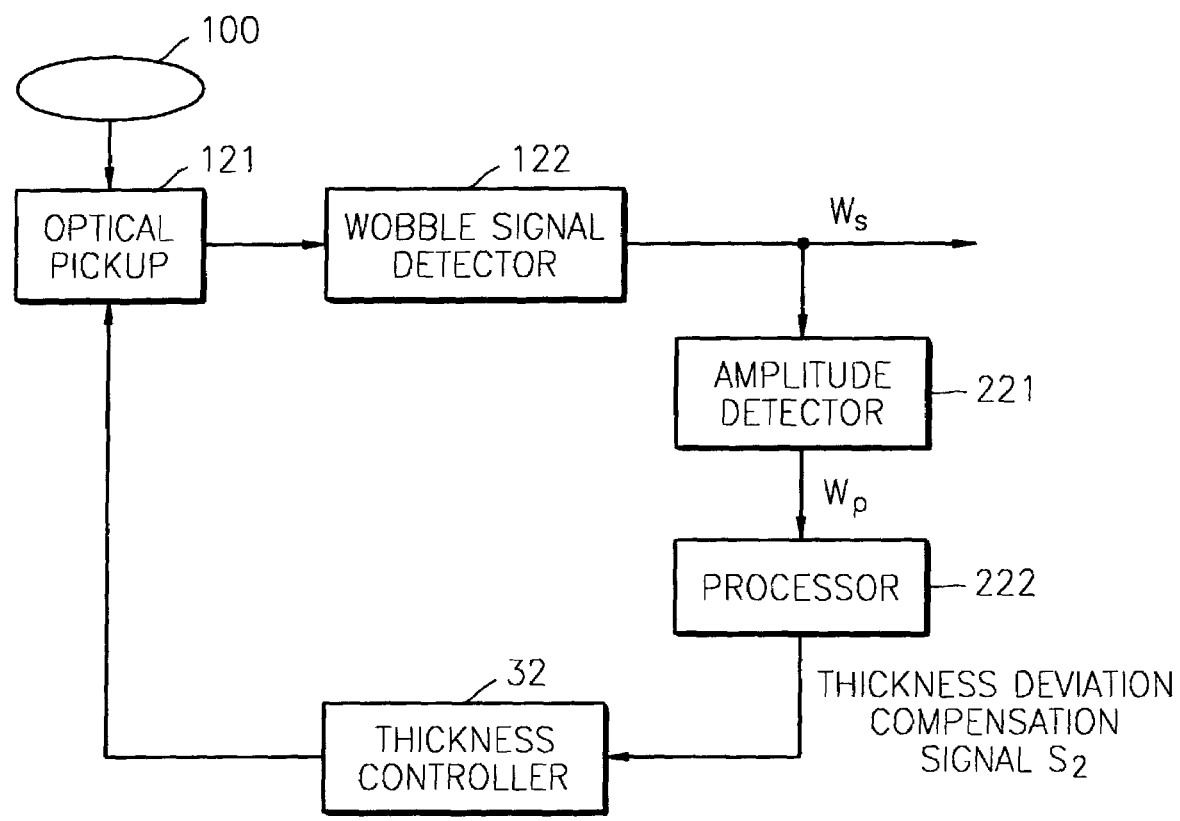
FIG. 10 is a block diagram of a second implementation of the recording and/or reproducing apparatus shown in FIG. 8.

FIG. 10 shows a block diagram of a second implementation of the recording and/or reproducing apparatus shown in FIG. 8. As shown in FIG. 10, the recording and/or reproducing apparatus includes an optical pickup 121, a wobble signal detector 122, an amplitude detector 221, and a processor 222. A thickness controller 32 is also included in the second implementation. The thickness controller 32 generates a control signal to compensate for a spherical aberration that occurs due to a thickness deviation, and transmits the control signal to the optical pickup 121.

The processor 222 continuously monitors an amplitude detection signal $W_p$ while variously changing a predetermined signal and outputting the variously changed signals to the thickness controller 32, and determines a signal, which brings an amplitude to a maximum, as a thickness deviation compensation signal $S_2$. Thus, the thickness controller 32 can reliably compensate for a spherical aberration. The functional blocks having the same names as those in FIGS. 8 and 9 perform the same functions, and thus the descriptions thereof will be omitted.

Figure 11:
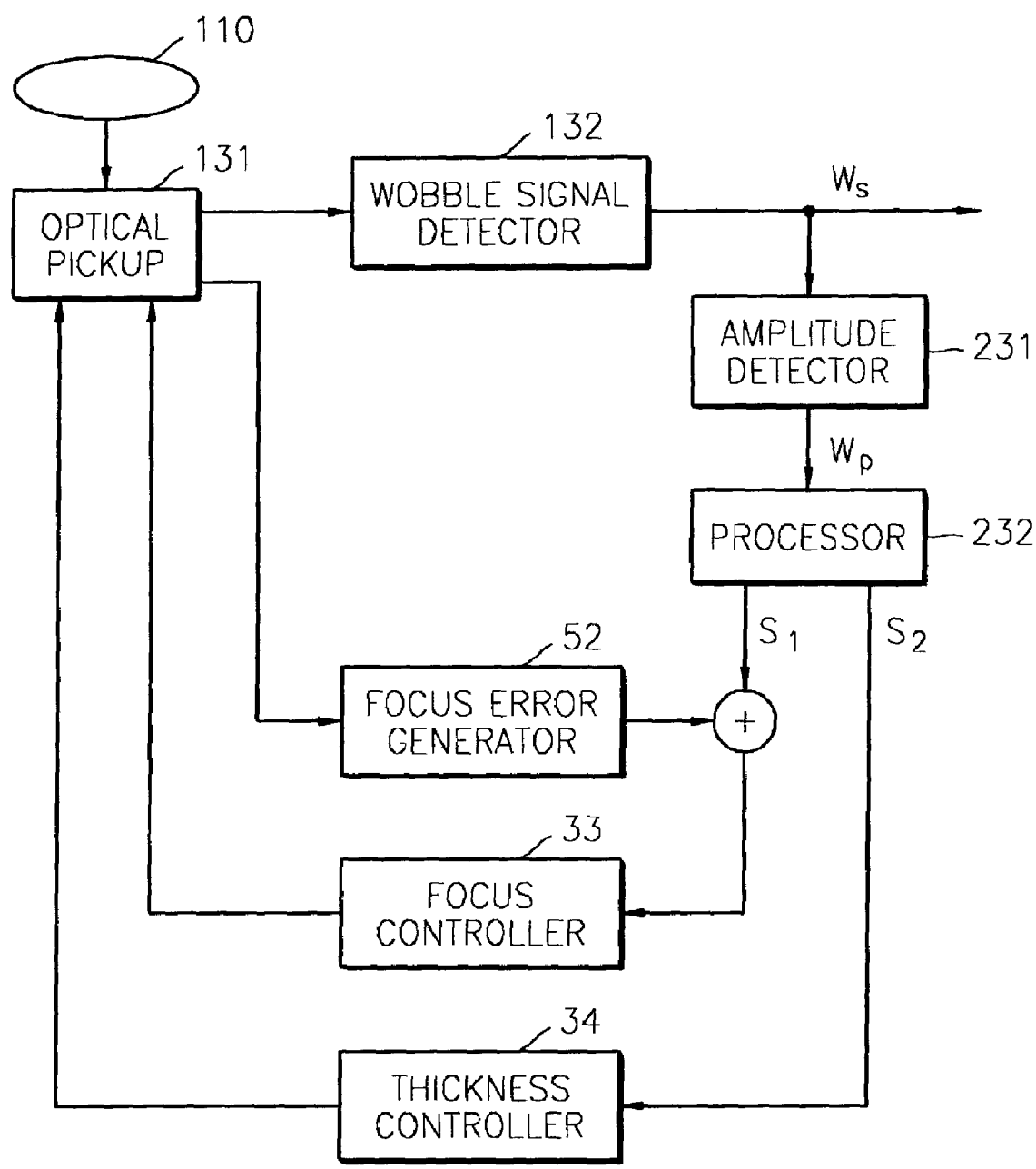
FIG. 11 is a block diagram of a third implementation of the recording and/or reproducing apparatus shown in FIG. 8.

FIG. 11 shows a block diagram of a third implementation of the recording and/or reproducing apparatus shown in FIG. 8. As shown in FIG. 11, the recording and/or reproducing apparatus includes an optical pickup 131, a wobble signal detector 132, an amplitude detector 231, and a processor 232. It also includes a focus error generator 52, a focus controller 33, and a thickness controller 32.

The focus error generator 52 outputs a focus error signal to the focus controller 33 to focus a laser beam radiating from the optical pickup 131 onto a recording/reproducing layer of an optical disc 110. The focus controller 33 generates a control signal based on the focus error signal and transmits the control signal to the optical pickup 131 to achieve a reliable focusing. The thickness controller 34 generates a control signal to compensate for a spherical aberration that occurs due to a thickness deviation and transmits the control signal to the optical pickup 131.

The processor 232 continuously monitors an amplitude detection signal $W_p$ while variously changing a predetermined signal and outputting the variously changed signals to the focus controller 33, and determines a signal, which brings an amplitude to a maximum, as a focus error compensation signal $S_1$. The focus error compensation signal $S_1$ is added to the focus error signal generated from the focus error generator 52 and is then input to the focus controller 33. Thus, the focus controller 33 can perform a reliable focus control. In addition, the processor 232 continuously monitors the amplitude detection signal $W_p$ while variously changing a predetermined signal and outputting the variously changed signals to the thickness controller 34 and determines a signal, which brings the amplitude to a maximum, as a thickness deviation compensation signal $S_2$. Thus, the thickness controller 34 can reliably compensate for a spherical aberration. The functional blocks having the same names as those in FIGS. 8, 9, and 10 perform the same functions, and thus the descriptions thereof will be omitted.

Figure 12:
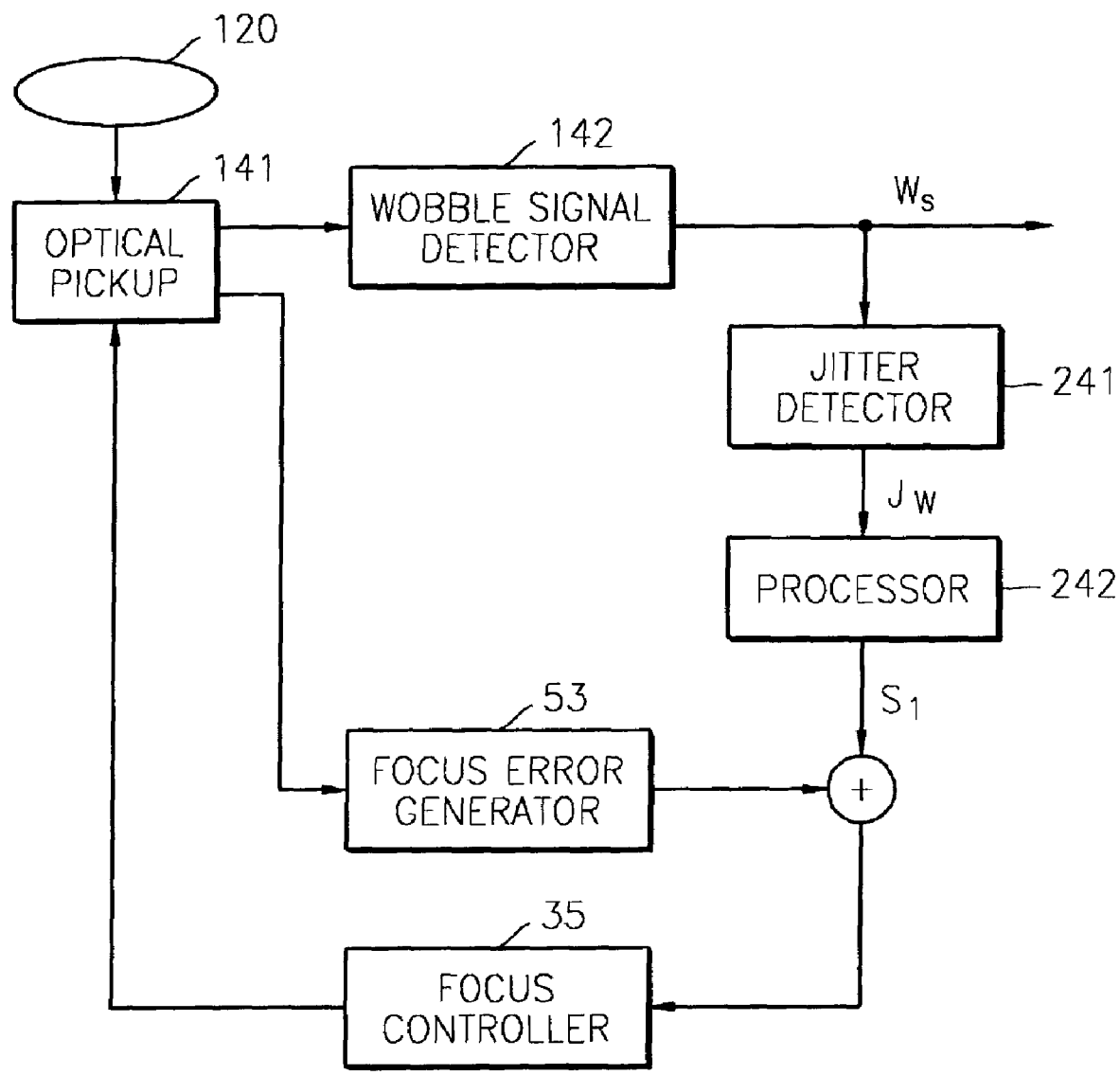
FIG. 12 is a block diagram of a fourth implementation of the recording and/or reproducing apparatus shown in FIG. 8.

FIG. 12 shows a block diagram of a fourth implementation of the recording and/or reproducing apparatus shown in FIG. 8. As shown in FIG. 12, the recording and/or reproducing apparatus includes an optical pickup 141, a wobble signal detector 142, and a processor 242. In the fourth implementation, a jitter detector 241, which detects a jitter from a wobble signal $W_s$ and outputs a jitter detection signal $J_w$, is provided as a characteristic extractor. Furthermore, a focus error generator 53 and a focus controller 35 which control a focus error are provided. The focus error generator 53 outputs a focus error signal to the focus controller 35 to focus a laser beam radiating from the optical pickup 141 onto a recording/reproducing layer of an optical disc 120. The focus controller 35 generates a control signal based on the focus error signal and transmits the control signal to the optical pickup 141 to achieve a reliable focusing.

The processor 242 continuously monitors the jitter detection signal $J_w$ while variously changing a predetermined signal and outputting the variously changed signals to the focus controller 35, and determines a signal, which brings the jitter to a minimum, as a focus error compensation signal $S_1$. The focus error compensation signal $S_1$ is added to the focus error signal generated from the focus error generator 53 and is then input to the focus controller 35. Thus, the focus controller 35 can perform a reliable focus control. The functional blocks having the same names as those in FIG. 8 perform the same functions, and thus the descriptions thereof will be omitted.

Figure 13:
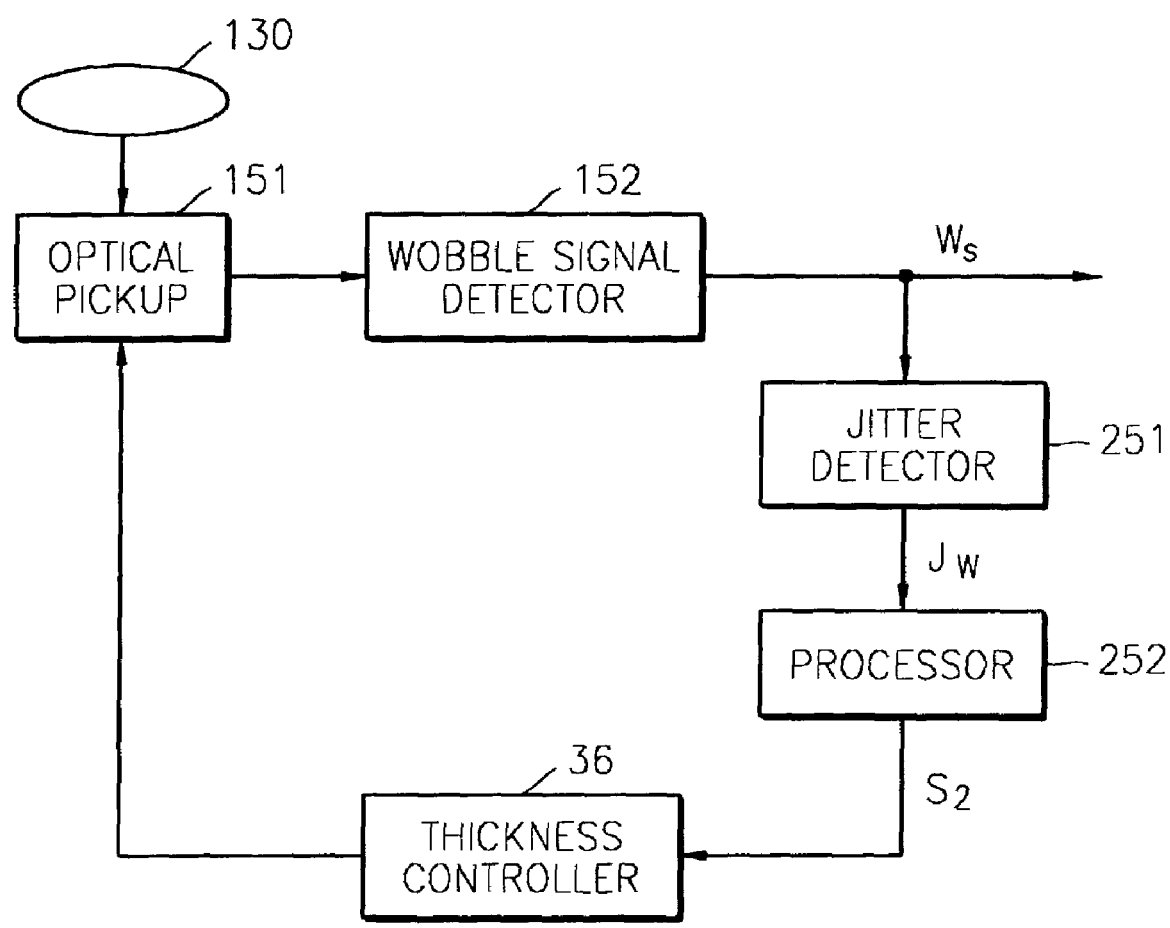
FIG. 13 is a block diagram of a fifth implementation of the recording and/or reproducing apparatus shown in FIG. 8.

FIG. 13 shows a block diagram of a fifth implementation of the recording and/or reproducing apparatus shown in FIG. 8. As shown in FIG. 13, the recording and/or reproducing apparatus includes an optical pickup 151, a jitter detector 251, and a processor 252. A thickness controller 36 is also included in the fifth implementation. The thickness controller 36 generates a control signal to compensate for a spherical aberration that occurs due to a thickness deviation, and transmits the control signal to the optical pickup 151.

The processor 252 continuously monitors a jitter detection signal $J_w$ while variously changing a predetermined signal and outputting the variously changed signals to the thickness controller 36, and determines a signal, which brings a jitter to a minimum, as a thickness deviation compensation signal $S_2$. Thus, the thickness controller 36 can reliably compensate for a spherical aberration. The functional blocks having the same names as those in FIGS. 8 and 12 perform the same functions, and thus the descriptions thereof will be omitted.

Figure 14:
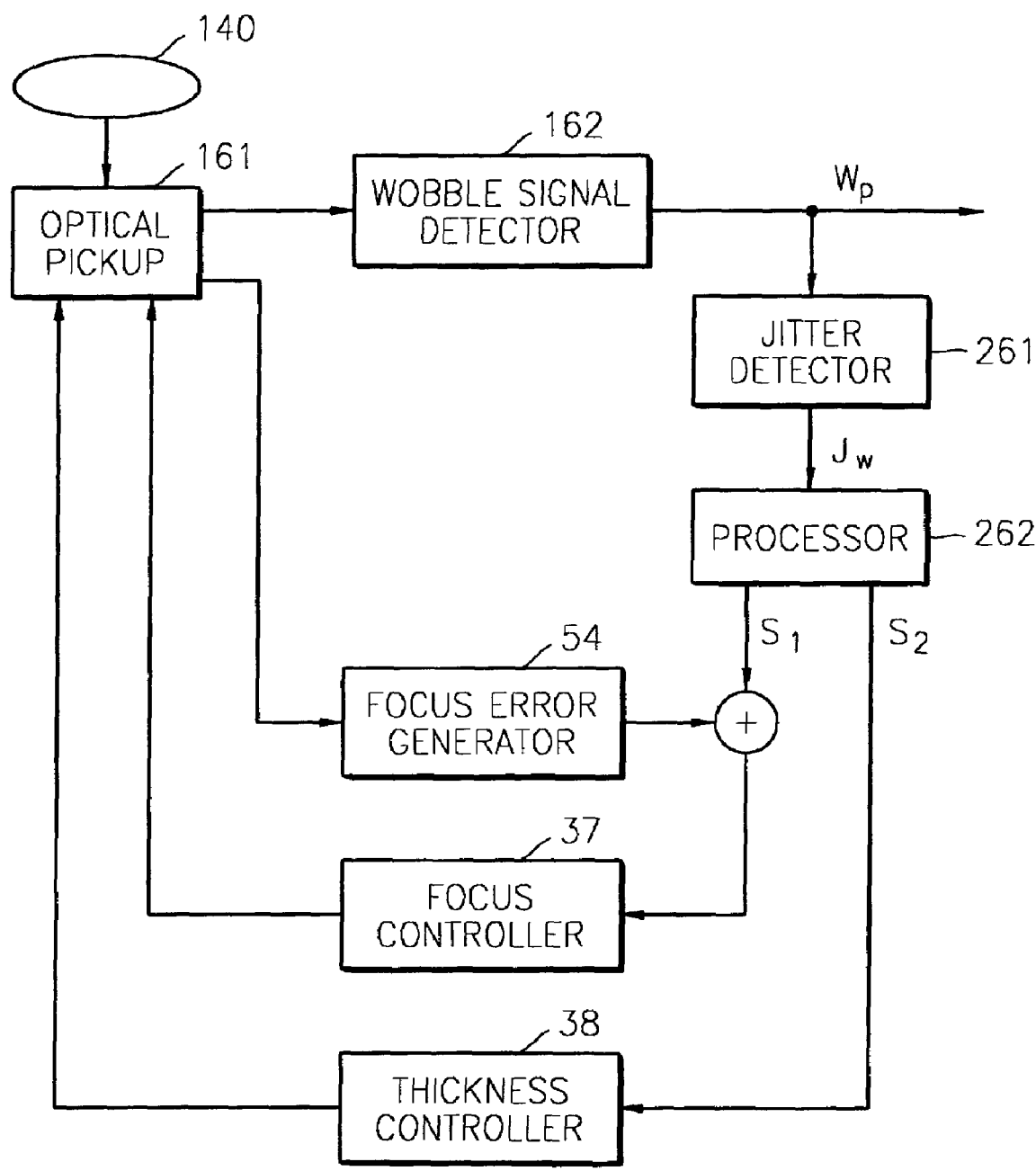
FIG. 14 is a block diagram of a sixth implementation of the recording and/or reproducing apparatus shown in FIG. 8.

FIG. 14 shows a block diagram of a sixth implementation of the recording and/or reproducing apparatus shown in FIG. 8. As shown in FIG. 14, the recording and/or reproducing apparatus includes an optical pickup 161, a wobble signal detector 162, a jitter detector 261, and a processor 262. It also includes a focus error generator 54, a focus controller 37, and a thickness controller 38.

The focus error generator 54 outputs a focus error signal to the focus controller 37 to focus a laser beam radiating from the optical pickup 161 onto a recording/reproducing layer of an optical disc 140. The focus controller 37 generates a control signal based on the focus error signal and transmits the control signal to the optical pickup 161 to achieve a reliable focusing. The thickness controller 38 generates a control signal to compensate for a spherical aberration occurring due to a thickness deviation, and transmits the control signal to the optical pickup 161.

The processor 262 continuously monitors a jitter detection signal $J_w$ while variously changing a predetermined signal and outputting the variously changed signals to the focus controller 37, and determines a signal, which brings a jitter to a minimum, as a focus error compensation signal $S_1$. The focus error compensation signal $S_1$ is added to the focus error signal generated from the focus error generator 54 and is then input to the focus controller 37. Thus, the focus controller 37 can perform a reliable focus control. In addition, the processor 262 continuously monitors the jitter detection signal $J_w$ while variously changing a predetermined signal and outputting the variously changed signals to the thickness controller 38, and determines a signal, which brings the jitter to a minimum, as a thickness deviation compensation signal $S_2$. Thus, the thickness controller 38 can reliably compensate for a spherical aberration. The functional blocks having the same names as those in FIGS. 8, 12, and 13 perform the same functions, and thus the descriptions thereof will be omitted.

Figure 15:
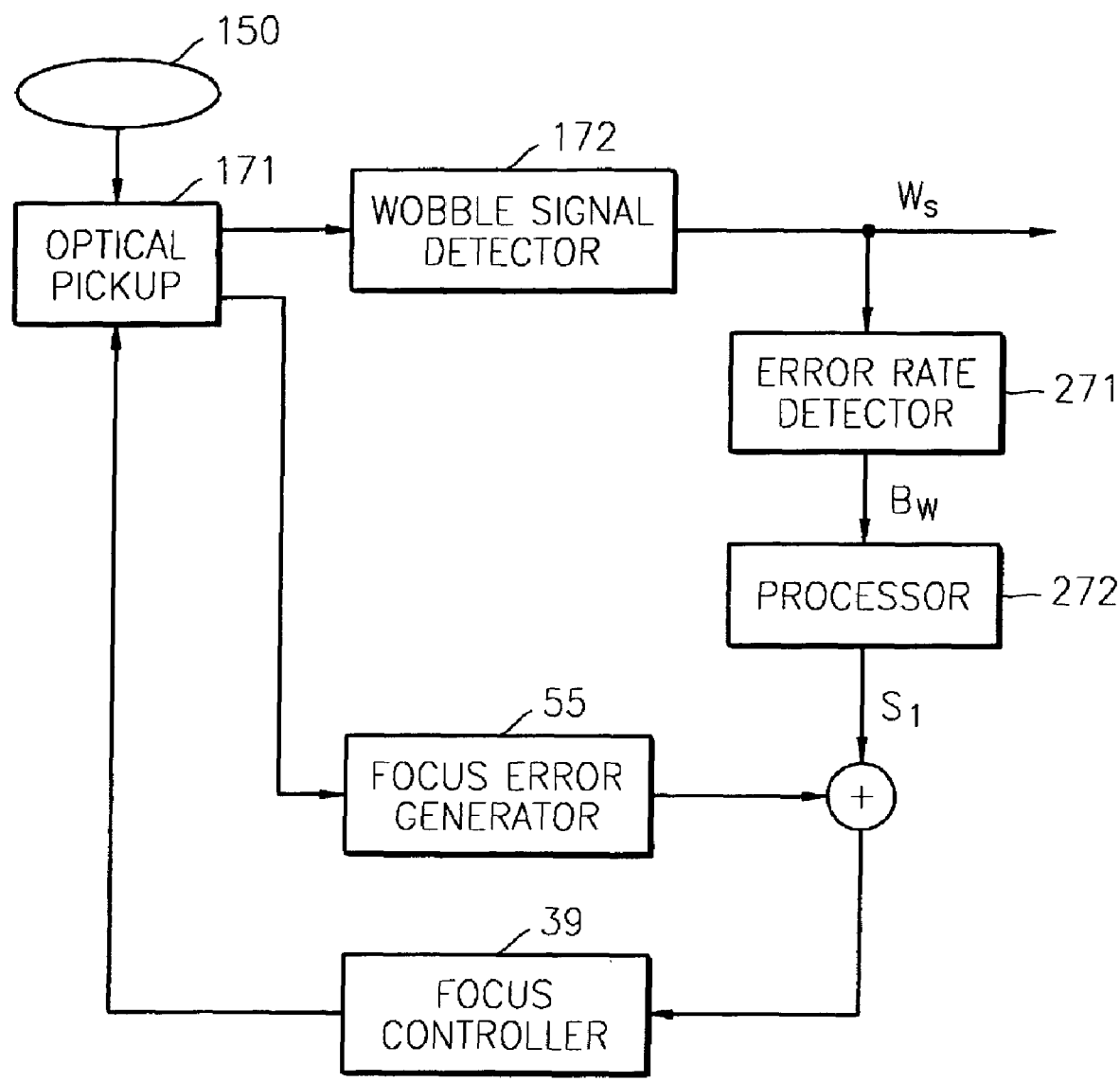
FIG. 15 is a block diagram of a seventh implementation of the recording and/or reproducing apparatus shown in FIG. 8.

FIG. 15 shows a block diagram of a seventh implementation of the recording and/or reproducing apparatus shown in FIG. 8. As shown in FIG. 15, the recording and/or reproducing apparatus includes an optical pickup 171, a wobble signal detector 172, and a processor 272. In the seventh implementation, an error rate detector 271, which detects an error rate with respect to a wobble signal $W_s$ and outputs an error rate detection signal $B_w$, is provided as a characteristic extractor. Furthermore, a focus error generator 55 and a focus controller 39 which control a focus error are provided. The focus error generator 55 outputs a focus error signal to the focus controller 39 to focus a laser beam radiating from the optical pickup 171 onto a recording/reproducing layer of an optical disc 150. The focus controller 39 generates a control signal based on the focus error signal and transmits the control signal to the optical pickup 171 to achieve a reliable focusing.

The processor 272 continuously monitors the error rate detection signal $B_w$ while variously changing a predetermined signal and outputting the variously changed signals to the focus controller 39, and determines a signal, which brings the error rate to a minimum, as a focus error compensation signal $S_1$. The focus error compensation signal $S_1$ is added to the focus error signal generated from the focus error generator 55 and is then input to the focus controller 39. Thus, the focus controller 39 can perform a reliable focus control. The functional blocks having the same names as those shown in FIG. 8 perform the same functions, and thus the descriptions thereof will be omitted.

Figure 16:
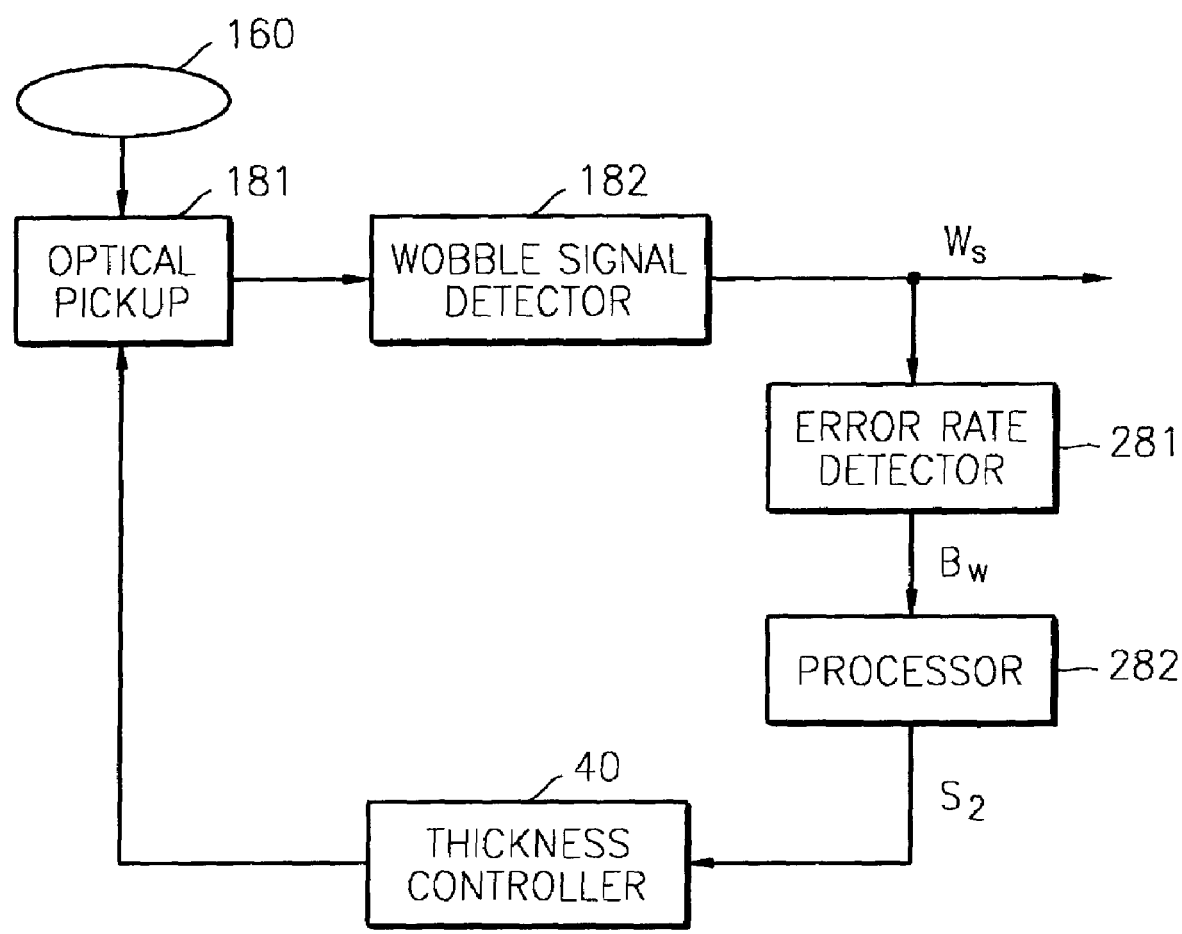
FIG. 16 is a block diagram of an eighth implementation of the recording and/or reproducing apparatus shown in FIG. 8.

FIG. 16 shows a block diagram of an eighth implementation of the recording and/or reproducing apparatus shown in FIG. 8. As shown in FIG. 16, the recording and/or reproducing apparatus includes an optical pickup 181, an error rate detector 281, and a processor 282. A thickness controller 40 is also included in the eighth implementation. The thickness controller 40 generates a control signal to compensate for a spherical aberration that occurs due to a thickness deviation and transmits the control signal to the optical pickup 181.

The processor 272 continuously monitors an error rate detection signal $B_w$ while variously changing a predetermined signal and outputting the variously changed signals to the thickness controller 40, and determines a signal, which brings an error rate to a minimum, as a thickness deviation compensation signal $S_2$. Thus, the thickness controller 40 can reliably compensate for a spherical aberration. The functional blocks having the same names as those in FIGS. 8 and 15 perform the same functions, and thus the descriptions thereof will be omitted.

Figure 17:
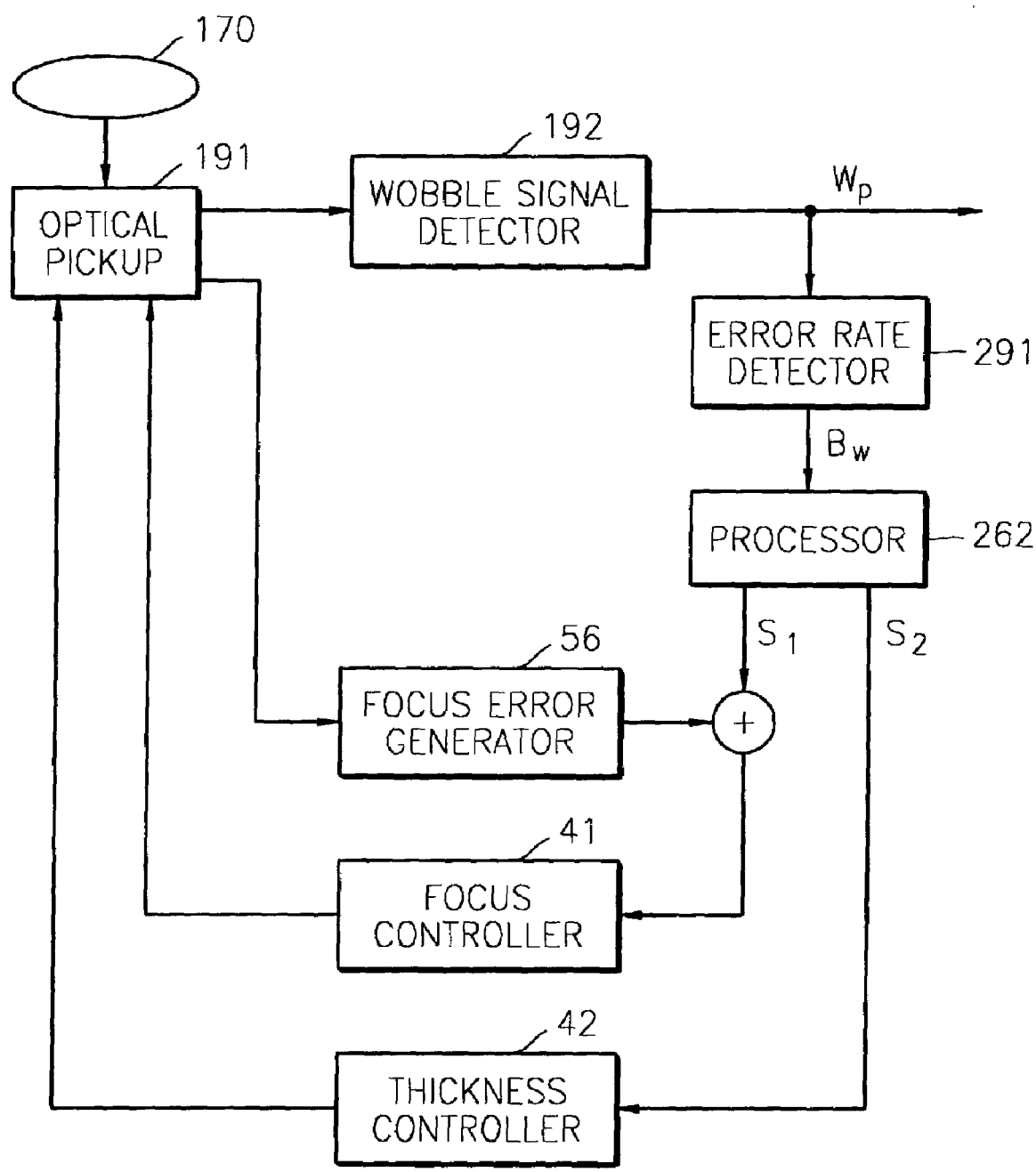
FIG. 17 is a block diagram of a ninth implementation of the recording and/or reproducing apparatus shown in FIG. 8.

FIG. 17 shows a block diagram of a ninth implementation of the recording and/or reproducing apparatus shown in FIG. 8. As shown in FIG. 17, the recording and/or reproducing apparatus includes an optical pickup 191, a wobble signal detector 192, an error rate detector 291, and a processor 292. It also includes a focus error generator 56, a focus controller 41, and a thickness controller 42.

The focus error generator 56 outputs a focus error signal to the focus controller 41 to focus a laser beam radiating from the optical pickup 191 onto a recording/reproducing layer of an optical disc 170. The focus controller 41 generates a control signal based on the focus error signal and transmits the control signal to the optical pickup 191 to achieve a reliable focusing. The thickness controller 42 generates a control signal to compensate for a spherical aberration that occurs due to a thickness deviation and transmits the control signal to the optical pickup 191.

The processor 292 continuously monitors an error rate detection signal $B_w$ while variously changing a predetermined signal and outputting the variously changed signals to the focus controller 41, and determines a signal, which brings an error rate to a minimum, as a focus error compensation signal $S_1$. The focus error compensation signal $S_1$ is added to the focus error signal generated from the focus error generator 56 and is then input to the focus controller 41. Thus, the focus controller 41 can perform a reliable focus control. In addition, the processor 292 continuously monitors the error rate detection signal $B_w$ while variously changing a predetermined signal and outputting the variously changed signals to the thickness controller 42, and determines a signal, which brings the error rate to a minimum, as a thickness deviation compensation signal $S_2$. Thus, the thickness controller 42 can reliably compensate for a spherical aberration. The functional blocks having the same names as those in FIGS. 8, 15 and 16 perform the same functions, and thus the descriptions thereof will be omitted.

Figure 18:
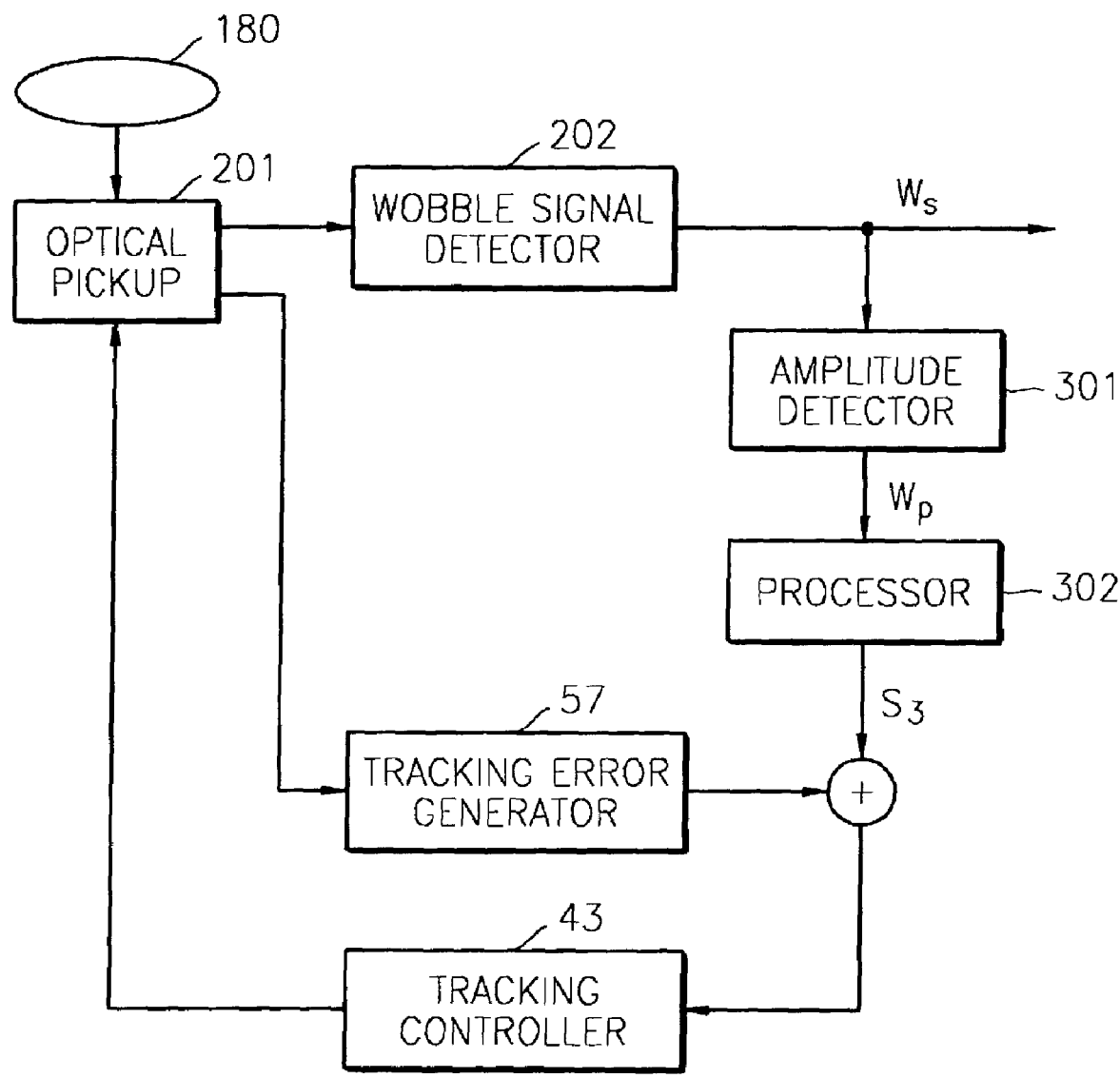
FIG. 18 is a block diagram of a tenth implementation of the recording and/or reproducing apparatus shown in FIG. 8.

FIG. 18 shows a block diagram of a tenth implementation of the recording and/or reproducing apparatus shown in FIG. 8. As shown in FIG. 18, the recording and/or reproducing apparatus includes an optical pickup 201, a wobble signal detector 202, an amplitude detector 301, and a processor 302. Furthermore, a tracking error generator 57 and a tracking controller 43 to control a tracking error are provided. The tracking error generator 57 outputs a tracking error signal to the tracking controller 43 to allow a laser beam radiating from the optical pickup 201 to perform correct tracking on an optical disc 180 without deviating from a track. The tracking controller 43 generates a control signal based on the tracking error signal and transmits the control signal to the optical pickup 201 to achieve a reliable tracking.

The processor 302 continuously monitors an amplitude detection signal $W_p$ while variously changing a predetermined signal and outputting the variously changed signals to the tracking controller 43, and determines a signal, which brings an amplitude to a maximum, as a tracking error compensation signal $S_3$. The tracking error compensation signal $S_3$ is added to the tracking error signal generated from the tracking error generator 57 and is then input to the tracking controller 43. Thus, the tracking controller 43 can perform a reliable tracking control.

A control method according to the present invention will be described based on the above-described configurations.

Figure 19:
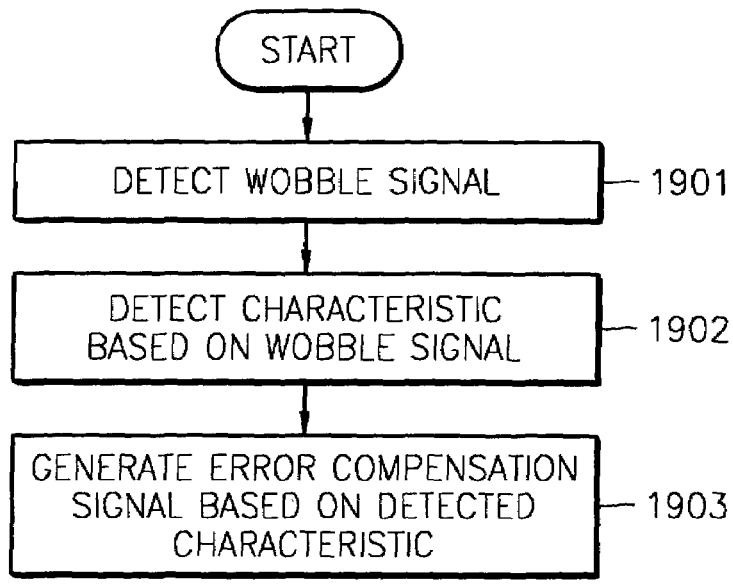
FIG. 19 is a flowchart of a control method according to an embodiment of the present invention.

FIG. 19 shows a flowchart of a control method according to an embodiment of the present invention. Referring to FIG. 19, where recording information in or reproducing information from a disc having wobbled tracks, a recording and/or reproducing apparatus detects a wobble signal recorded in a wobbled track in operation 1901. An error component which occurs during a recording or reproducing operation is removed based on the detected wobble signal. To remove the error component, an error compensation signal is generated and applied. In other words, at least one characteristic among a jitter, an error rate, an amplitude, an envelope, and a peak value of the wobble signal is detected in operation 1902. An error compensation signal which removes the error component is generated based on the detected characteristic in operation 1903. For example, the error compensation signal is determined through the following procedure. The recording and/or reproducing apparatus monitors characteristic values or characteristic signals, which are detected while changing a predetermined signal, and determines a signal with respect to which a characteristic value or characteristic signal is optimal for recording or reproducing as the error compensation signal.

Figure 20:
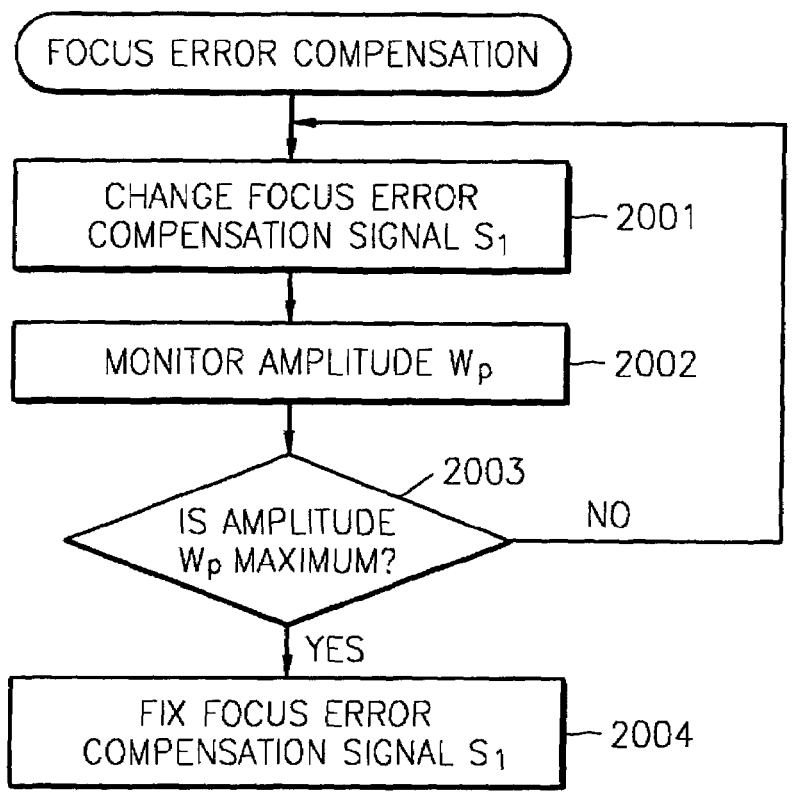
FIGS. 20 through 22 are flowcharts of a procedure for determining a focus error compensation signal.
Figure 21:
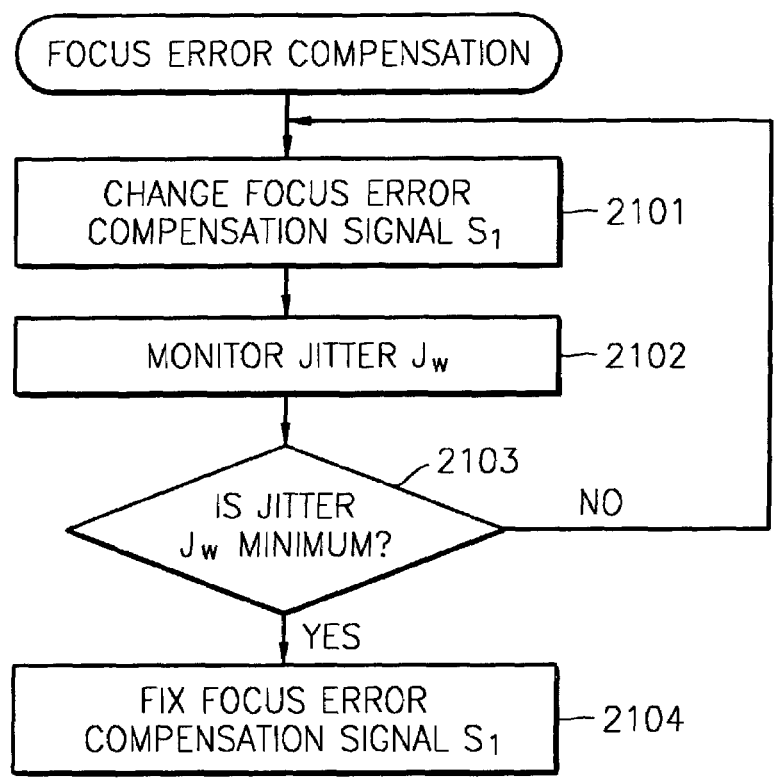
Figure 22:
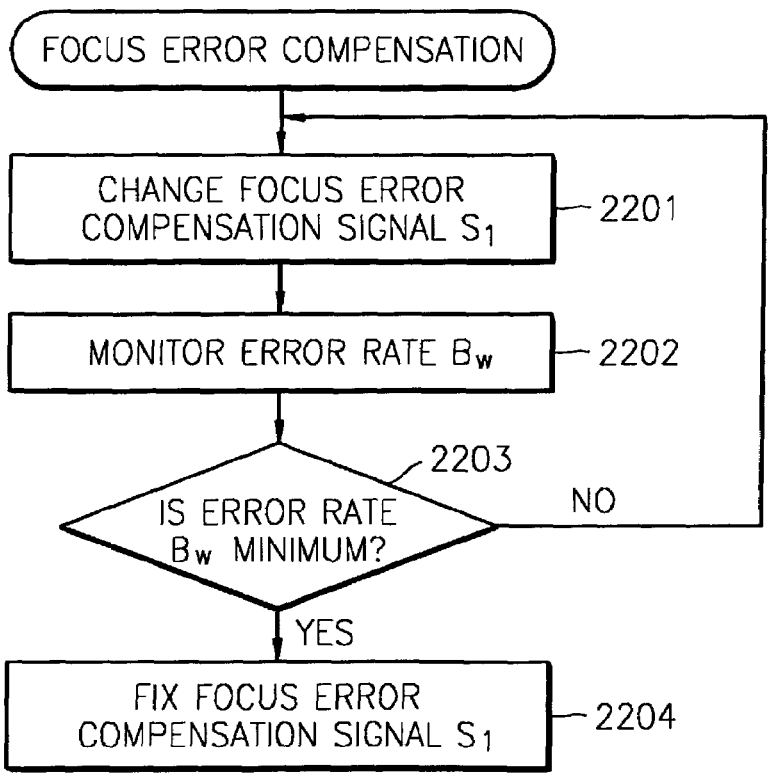

FIGS. 20 through 22 show flowcharts of a procedure to determine a focus error compensation signal $S_1$. Referring to FIG. 20, a recording and/or reproducing apparatus of the present invention changes a focus error compensation signal $S_1$ in operation 2001 and monitors an amplitude $W_p$ of a wobble signal in operation 2002. In response to a determination that the amplitude $W_p$ is at a maximum, in operation 2003, the focus error compensation signal $S_1$ is fixed in operation 2004.

Referring to FIG. 21, a recording and/or reproducing apparatus of the present invention changes a focus error compensation signal $S_1$ in operation 2101 and monitors a jitter $J_w$ of a wobble signal in operation 2102. In response to a determination that the jitter $J_w$ reaches a minimum level, in operation 2103, the focus error compensation signal $S_1$ is fixed in operation 2104.

Referring to FIG. 22, a recording and/or reproducing apparatus of the present invention changes a focus error compensation signal $S_1$ in operation 2201 and monitors an error rate $B_w$ of a wobble signal in operation 2202. In response to a determination that the error rate $B_w$ reaches a minimum level, in operation 2203, the focus error compensation signal $S_1$ is fixed in operation 2204.

Figure 23:
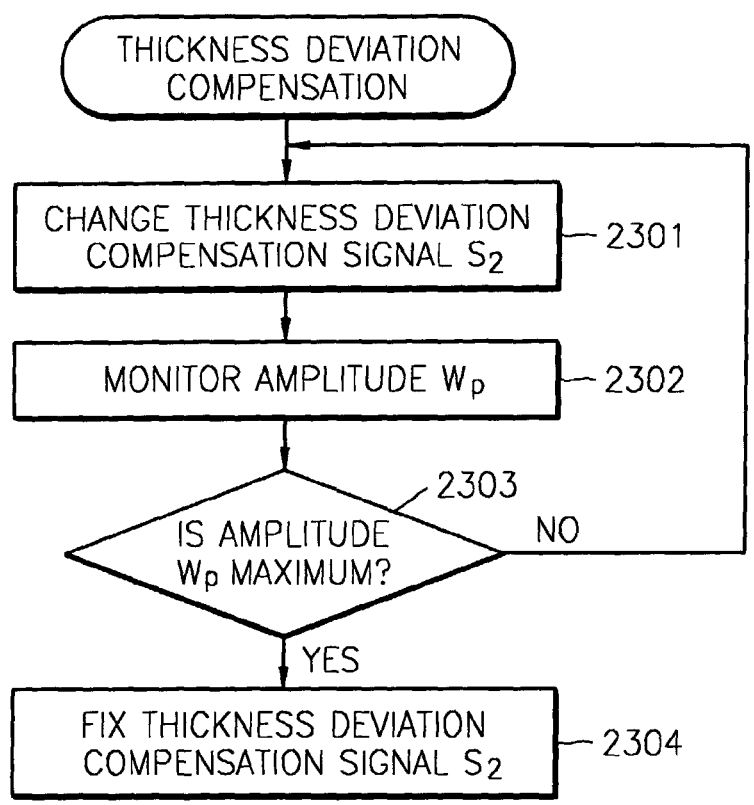
FIGS. 23 through 25 are flowcharts of a procedure for determining a thickness deviation compensation signal.
Figure 24:
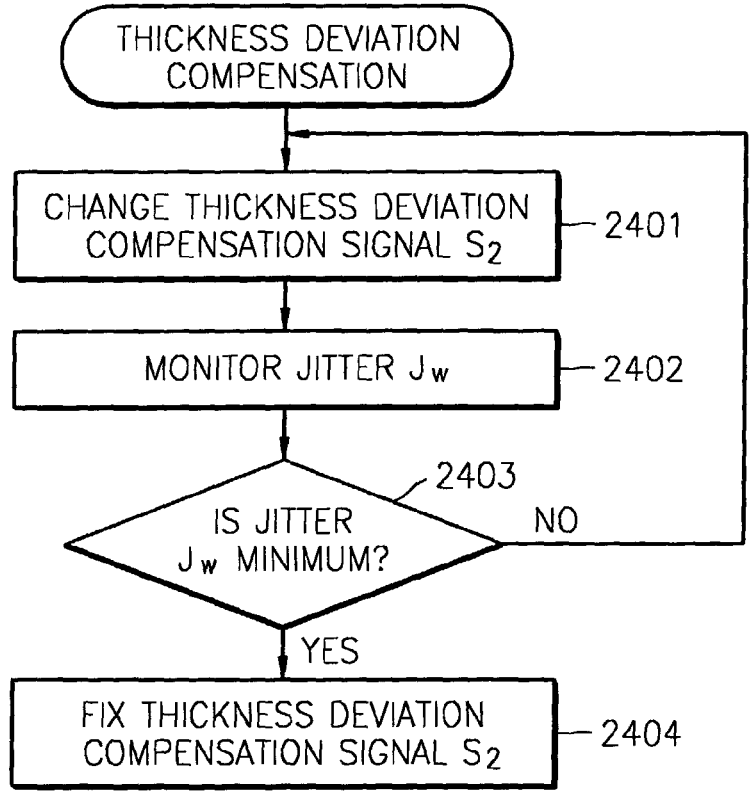
Figure 25:
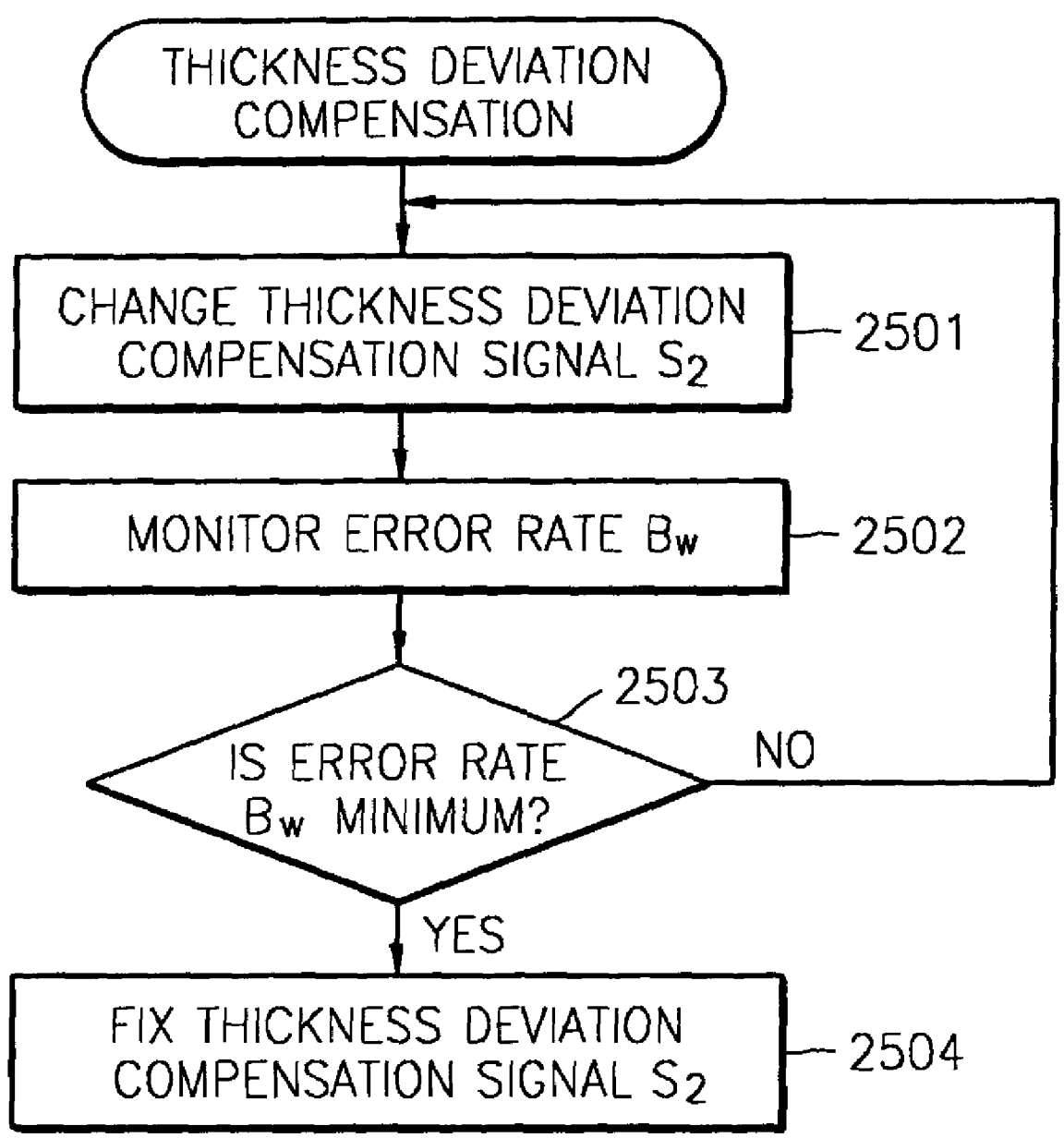

FIGS. 23 through 25 show flowcharts of a procedure to determine a thickness deviation compensation signal $S_2$. Referring to FIG. 23, a recording and/or reproducing apparatus of the present invention changes a thickness deviation compensation signal $S_2$ in operation 2301 and monitors an amplitude $W_p$ of a wobble signal in operation 2302. In response to a determination that the amplitude $W_p$ reaches a maximum level, in operation 2303, the thickness deviation compensation signal $S_2$ is fixed in operation 2304.

Referring to FIG. 24, a recording and/or reproducing apparatus of the present invention changes a thickness deviation compensation signal $S_2$ in operation 2401 and monitors a jitter $J_w$ of a wobble signal in operation 2402. In response to a determination that the jitter $J_w$ reaches a minimum level, in operation 2403, the thickness deviation compensation signal $S_2$ is fixed in operation 2404.

Referring to FIG. 25, a recording and/or reproducing apparatus of the present invention changes a thickness deviation compensation signal $S_2$ in operation 2501 and monitors an error rate $B_w$ of a wobble signal in operation 2502. In response to a determination that the error rate $B_w$ reaches a minimum level, in operation 2503, the thickness deviation compensation signal $S_2$ is fixed in operation 2504.

In addition to an amplitude, a jitter, and an error rate, a peak value and an envelope signal may be monitored with respect to a wobble signal to determine a focus error compensation signal or a thickness deviation compensation signal. Moreover, at least one characteristic among an amplitude, a jitter, an error rate, a peak value, and an envelope signal with respect to a wobble signal may be monitored to determine a tracking error compensation signal. Here, the methods shown in FIGS. 20 through 25 can be used.

It is understood that a system which uses the present invention also includes permanent or removable storage, such as magnetic optical discs, RAM, ROM, etc., on which the process and data structures of the present invention can be stored and distributed. The operations can also be distributed via, for example, downloading over a network such as the Internet.

As described above, according to a recording and/or reproducing apparatus and a method of controlling the same of the present invention, errors arising from a variety of factors can be accurately compensated for during a recording or reproducing operation.

Although a few embodiments of the present invention have been shown and described, it will be appreciated by those skilled in the art that changes may be made in these embodiments without departing from the principles and spirit of the invention, the scope of which is defined in the appended claims and their equivalents.

What is claimed is:

1. A method of controlling an apparatus for recording or reproducing information on/from a disc having a wobbled track, the method comprising:
   wherein the error compensation signal is generated by monitoring the extracted characteristic, including an amplitude of the wobble signal, and fixing the error compensation signal as the determined error compensation signal in response to the amplitude of the wobble signal being substantially at a maximum level
   detecting a wobble signal recorded on the wobbled track from the disc for error compensation; and
   removing an error component occurring during a recording or reproducing operation, based on the wobble signal,
   where the removing of an error component comprises:
      extracting at least one characteristic of the wobble signal among a jitter, an error rate, an envelope, and a peak value of the wobble signal;
      changing a predetermined error compensation signal to determine an error compensation signal corresponding to an optimal characteristic value or an optimal characteristic signal of the extracted characteristic of the wobble signal; and
      generating an error compensation signal corresponding to the determined error compensation signal to remove the error component, based on the optimal characteristic value or the optimal characteristic signal of the extracted characteristic of the wobble signal, and
   wherein the generating of the error compensation signal comprises:
      monitoring the extracted characteristic, including an amplitude of the wobble signal; and
      fixing the error compensation signal as the determined error compensation signal in response to the amplitude of the wobble signal being substantially at a maximum level.

2. The method of claim 1, wherein:
   the changing of the predetermined error compensation signal comprises changing a focus error compensation signal to determine a focus error compensation signal corresponding to the optimal characteristic value or the optimal characteristic signal of the extracted characteristic of the wobble signal, and
   the fixing of the error compensation signal comprises fixing the focus error compensation signal as the determined error compensation signal in response to the extracted characteristic of the wobble signal to enable accurate data recording or reproduction.

3. The method of claim 2, further comprising:
   adding the fixed focus error compensation signal as the determined error compensation signal to a focus error signal provided to the apparatus; and
   performing a focus control based on a result of the adding the fixed focus error compensation signal as the determined error compensation signal to the focus error signal.

4. An apparatus for recording or reproducing information on/from a disc having a wobbled track, comprising:
   a wobble signal detection unit which detects a wobble signal recorded on the wobbled track from the disc for error compensation; and
   an error compensation unit which removes an error component occurring during a recording and reproducing operation, based on the wobble signal detected by the wobble signal detection unit, the error compensation unit comprising:
      a characteristic extractor which extracts at least one characteristic of the wobble signal among a jitter, an error rate, an envelope, and a peak value of the wobble signal; and
      a processor which changes a predetermined signal to determine an error compensation signal corresponding to an optimal characteristic value or an optimal characteristic signal of the extracted characteristic of the wobble signal, generates an error compensation signal corresponding to the determined error compensation signal to remove the error component, based on the optimal characteristic value or the optimal characteristic signal of the extracted characteristic of the wobble signal, and outputs the determined error compensation signal to remove the error component, based on the extracted characteristic of the wobble signal,
      wherein the processor generates the error compensation signal by monitoring the extracted characteristic, including an amplitude of the wobble signal, and fixing the error compensation signal as the determined error compensation signal in response to the amplitude of the wobble signal being substantially at a maximum level to enable accurate data recording or reproduction.

5. The apparatus of claim 4, wherein the processor monitors the extracted characteristic of the wobble signal, while changing the predetermined signal and determines a signal, with respect to which extracted characteristic of the wobble signal is optimal for a recording or reproducing operation, as the determined error compensation signal.

6. A method of removing an error component occurring during recording or reproducing information from a disc having a wobbled track, the method comprising:
   extracting at least one characteristic of a wobble signal recorded on the wobbled track from the disc for error compensation, among a jitter, an error rate, an envelope, and a peak value of the wobble signal;
   generating an error compensation signal according to the extracted characteristic of the wobble signal by changing a predetermined signal to determine an error compensation signal corresponding to an optimal characteristic value or an optimal characteristic signal of the extracted characteristic of the wobble signal; and
   removing the error component from an information signal during a recording or reproducing operation according to the determined error compensation signal, wherein the generating of the error compensation signal comprises:
    monitoring the extracted characteristic, including an amplitude of the wobble signal; and
    fixing the error compensation signal as the determined error compensation signal in response to the amplitude of the wobble signal being substantially at a maximum level.

7. The method of claim 6, wherein the generating of the error compensation signal further comprises:
    monitoring the extracted characteristic of the wobble signal, while changing the predetermined signal;
    determining a signal, from the changing of the predetermined signal, with respect to which the extracted characteristic of the wobble signal is optimal for a recording or reproducing operation as the determined error compensation signal; and
    fixing the determined error compensation signal as the error compensation signal.

8. A computer readable medium encoded with operating instructions for implementing a method of controlling an apparatus for recording or reproducing information on/from a disc having a wobbled track, performed by a computer, the method comprising:
    detecting a wobble signal recorded on the wobbled track from the disc for error compensation; and
    removing an error component occurring during a recording or reproducing operation, based on the wobble signal,
    wherein the removing of the error component comprises:
        extracting at least one characteristic of the wobble signal among a jitter, an error rate, an envelope, and a peak value of the wobble signal;
        changing a predetermined signal to determine an error compensation signal corresponding to an optimal characteristic value or an optimal characteristic signal of the extracted characteristic of the wobble signal; and
        generating an error compensation signal corresponding to the determined error compensation signal to remove the error component, based on the optimal characteristic value or the optimal characteristic signal of the extracted characteristic of the wobble signal, and
    wherein the generating of the error compensation signal comprises:
        monitoring the extracted characteristic, including an amplitude of the wobble signal; and
        fixing the error compensation signal as the determined error compensation signal in response to the amplitude of the wobble signal being substantially at a maximum level to enable accurate data recording or reproduction.

9. The computer readable medium of claim 8, wherein the generating of the error compensation signal further comprises:
    changing a predetermined error compensation signal as the predetermined signal;
    monitoring the extracted characteristic of the wobble signal; and
    fixing the error compensation signal as the determined error compensation signal in response to the extracted characteristic of the wobble signal to enable accurate data recording or reproduction.

10. The computer readable medium of claim 8, wherein the generating of the error compensation signal further comprises:
    monitoring the extracted characteristic of the wobble signal, while changing the predetermined signal; and
    determining a signal, from the changing of the predetermined signal, with respect to which the extracted characteristic is optimal for a recording or reproducing operation, as the determined error compensation signal.

* * * * *